(12) United States Patent
Gunter et al.

(10) Patent No.: US 8,846,969 B2
(45) Date of Patent: Sep. 30, 2014

(54) PHENOLIC CONFIGURATIONALLY LOCKED POLYENE BULK SINGLE CRYSTALS, CRYSTALLINE THIN FILMS AND WAVEGUIDES FOR ELECTRO-OPTICS AND THZ-WAVE APPLICATIONS

(75) Inventors: Peter Gunter, Riedt-Neerach (CH); Mojca Jazbinsek, Dubendorf (CH); O-Pil Kwon, Suwon (KR); Seong-Ji Kwon, Zurich (CH); Christoph Hunziker, Mellingen (CH); Harry Figi, Zurich (CH)

(73) Assignee: Rainbow Photonics AG, Zurich (CH)

( * ) Notice: Subject to any disclaimer, the term of this patent is extended or adjusted under 35 U.S.C. 154(b) by 693 days.

(21) Appl. No.: 12/991,257

(22) PCT Filed: May 5, 2009

(86) PCT No.: PCT/CH2009/000142
§ 371 (c)(1), (2), (4) Date: Feb. 10, 2011

(87) PCT Pub. No.: WO2009/135329
PCT Pub. Date: Nov. 12, 2009

(65) Prior Publication Data
US 2011/0128610 A1  Jun. 2, 2011

(30) Foreign Application Priority Data
May 6, 2008 (EP) .................... 08008483

(51) Int. Cl.
| | |
|---|---|
| *C07C 255/00* | (2006.01) |
| *G02F 1/361* | (2006.01) |
| *G02F 1/061* | (2006.01) |
| *G02F 1/065* | (2006.01) |
| *G02F 1/225* | (2006.01) |

(52) U.S. Cl.
CPC .......... *G02F 1/3611* (2013.01); *G02F 2203/15* (2013.01); *G02F 2203/13* (2013.01); *G02F 1/065* (2013.01); *G02F 1/225* (2013.01); *G02F 1/061* (2013.01)
USPC ....................................... 558/426

(58) Field of Classification Search
USPC ....................................... 558/426
See application file for complete search history.

(56) References Cited

U.S. PATENT DOCUMENTS 5,535,048 A    7/1996  Mignani et al.

OTHER PUBLICATIONS

Tsonko Kolev, et al.: "2-{3-[2-(4-Hydroxyphenyl)vinyl]-5,5-dimethylcyclohex-2-en-1-ylindene}malononitrile", Acta Crystallographica, vol. E57, 2001, pp. 0561-0562, XP002535783, IUC, the whole document.
O-Pil Kwon, et al.: "Organic Electro-optic Single-Crystalline Thin Films Grown Directly on Modified Amorphous Substrates.", Advanced Materials, vol. 20, Jan. 8, 2008, pp. 543-545, XP002535785, Wiley-VCH, pp. 1-3, figures 1-3.
O-Pi Kwon, et al.: "Organic Nonlinear Optical Crystals Based on Configurationally Locked Polyene for Melt Growth", Chemistry of Materials, vol. 18, 2006, pp. 4049-4054, XP002535784, ACVS, abstract, Introduction, Experimental Section, X-ray Crystal Structures, Melt crystal Growth Conclusions.

*Primary Examiner* — Samantha Shterengarts
(74) *Attorney, Agent, or Firm* — Rankin, Hill & Clark LLP

(57) ABSTRACT

The invention concerns Phenolic Configurationally Locked Polyene Single Crystals, which are especially suited as highly efficient nonlinear optical organic material. The invention also concerns methods for growth of crystalline thin films or bulk crystals from melt and/or solution. The compounds are suited and the methods may be used for manufacturing optical elements for several bulk and integrated applications, e.g. electro-Optics and THz-Wave applications.

6 Claims, 10 Drawing Sheets

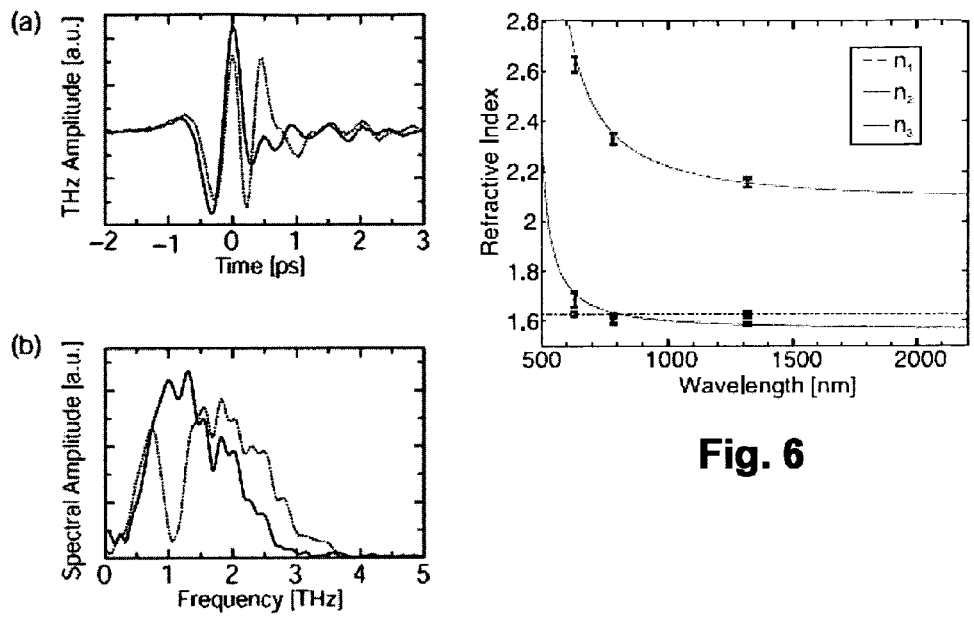
Fig. 5
Fig. 6
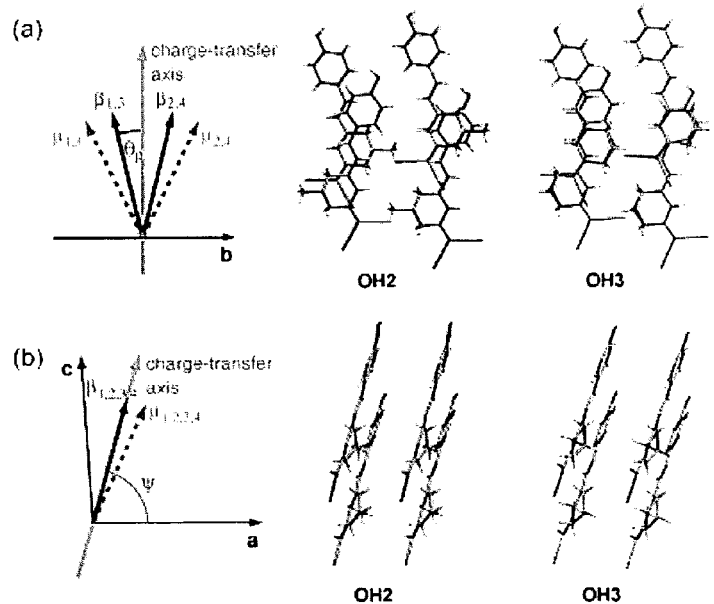
Fig. 8

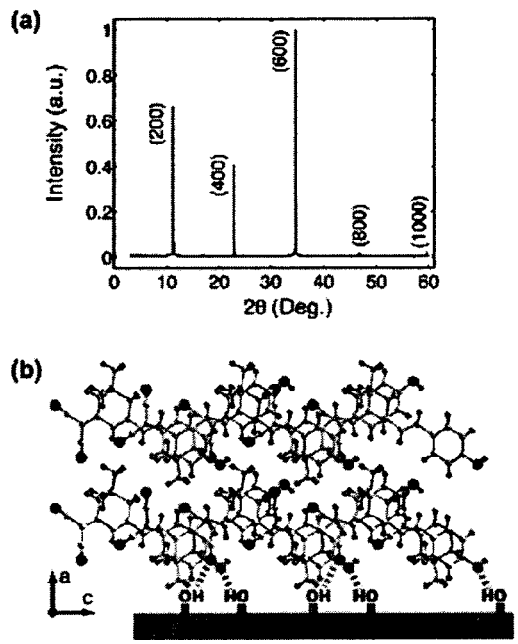
Fig. 29
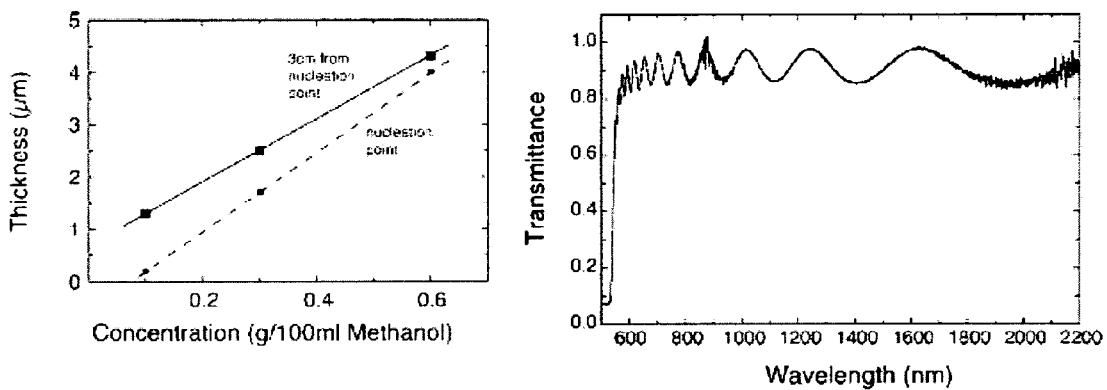
Fig. 31  Fig. 30

PHENOLIC CONFIGURATIONALLY LOCKED POLYENE BULK SINGLE CRYSTALS, CRYSTALLINE THIN FILMS AND WAVEGUIDES FOR ELECTRO-OPTICS AND THZ-WAVE APPLICATIONS

FIELD OF THE INVENTION

The invention concerns Phenolic Configurationally Locked Polyene compounds, which are, in crystalline form, especially suited as highly efficient nonlinear optical organic material. The invention also concerns methods for growth of crystalline thin films or bulk crystals from melt and/or solution. The compounds are suited and the methods may be used for manufacturing optical elements for several bulk and integrated optical applications, e.g. for electro-Optics and THz-Wave applications.

BACKGROUND OF THE INVENTION

1. Introduction

Highly efficient nonlinear optical organic materials are of great interest for various applications in optical telecommunication [1, 2, 3, 4] and terahertz wave applications [5, 6, 7]. Due to their almost purely electronic response, organic materials show extremely fast optical nonlinearities compared to their inorganic counterparts, and therefore promise to meet future requirements for ultra-high bandwidth photonic devices (up to 200 GHz an more) for next-generation fiber-optical data transmission networks (ultrafast internet), local-area networks and on-chip applications, as well as sensor applications and field detection. For high-speed second-order nonlinear optical applications, such as electro-optics, second-harmonic generation, optical parametric oscillation, and optical rectification, including terahertz wave generation, a highly asymmetric electronic response of the material to the external electric field is required. A noncentrosymmetric arrangement of the molecules may be induced by spontaneous self-assembly by intermolecular interactions in the crystalline lattice or external poling in a polymer matrix. In crystals the long-term temporal stability of the acentric arrangement of molecules, chromophore density and photochemical stability [8] are significantly superior to those of polymers. Although the strategies leading to large microscopic molecular nonlinearities in a gas phase based on highly extended π-conjugated bridge between electron donor and acceptor groups are well established [1, 2, 9, 10], the desired acentric arrangement of molecules with a high molecular nonlinearity in the solid state is still a very challenging topic.

The state-of-the-art organic nonlinear optical crystals are ionic stilbazolium salts with large electro-optic coefficients of more than 50 pm/V at 1.3 and 1.55 μm, such as DAST (4'-dimethylamino-N-methyl-4-stilbazolium tosylate) [11] and DSTMS (4'-dimethylamino-N-methyl-4-stilbazolium 2,4,6-trimethylbenzenesulfonate) [7]. DAST is presently the only commercially available highly nonlinear organic crystal and exhibits a very large non-resonant nonlinear optical susceptibility $\chi_{111}^{(2)}(-2\omega,\omega,\omega)=420$ pm/V at 1.9 μm and a large electro-optic coefficient $r_{111}=53\pm6$ pm/V at 1.3 μm [12]. However, due to the ionic characteristics of stilbazolium salts, their thermal stability is insufficient for applying melt-based crystal growth techniques, which considerably limits the applicability of these crystals for very large scale integrated photonic structures. Furthermore, they have a tendency to form a centrosymmetric hydrated phase in presence of water. Therefore, there is a strong interest to develop new highly nonlinear optical organic crystals with a possibility of melt-based material processing.

Among various crystal engineering approaches [1] to obtain noncentrosymmetric crystal structure, configurationally locked polyene (CLP) crystals developed recently have shown to have high tendency to form acentric crystals with large macroscopic second-order nonlinearities, high thermal stability and the possibility of various melt- and solution-based crystal growth techniques [13, 14, 15]. In the CLP crystals having aliphatic or phenolic OH groups, their main supramolecular interactions are head-to-tail hydrogen bonds of —OH . . . NC— groups at opposite ends of the molecules, leading to large macroscopic nonlinearities [14].

SUMMARY OF THE INVENTION

It is an object of the invention to provide a CLP compound that crystallizes in a non-centrosymmetric structure and is thus suited for second-order nonlinear optical applications, such as electro-optic applications and frequency conversion.

It is a further object of the invention to provide methods for forming single crystal CLP thin films and bulk single CLP crystals of second-order nonlinear optical material.

It is a further object of the invention to provide an integrated optical element suitable for a variety of second-order nonlinear optical applications.

These and other objects are solved by the invention as described in the claims and the subsequent description.

The invention is based on the development of non-ionic organic configurationally locked polyene (CLP) single crystals containing a phenolic electron donor with very large electro-optic response and high thermal and environmental stability.

The compounds are represented by the formula (I)

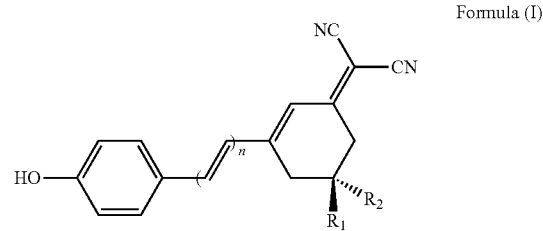

Formula (I)

wherein n=1, 2, 3 or 4, and wherein R1 and R2, being identical or different, are independently chosen from the group consisting of: H (Hydrogen), D (Deuterium), any perhalogenated, halogenated or non-halogenated aliphatic or aromatic group, wherein at least one carbon atom of this aliphatic or aromatic group is optionally functionalized with at least one of: hydroxy, ether, ester, amino, silyl, and siloxy group.

The Phenolic CLP compound 2-(3-(4-hydroxystyryl)-5,5-dimethylcyclohex-2-enylidene)malononitrile (with R1=R2=CH$_3$ and n=1) is designated as OH1. Phenolic CLP crystals OH1 with orthorhombic space group Pna2$_1$ (point group mm2) exhibit large second-order nonlinear optical figures of merit, high thermal stability and very favorable crystal growth characteristics. Higher solubility in methanol and a larger temperature difference between the melting temperature and the decomposition temperature of OH1 compared to analogous CLP crystals, are of advantage for solution and melt crystal growth, respectively. Acentric bulk OH1 crystals of large sizes with side lengths of more than 1 cm with excellent optical quality have been successfully grown from methanol solution. The OH1 crystals exhibit a large macroscopic nonlinearity with four times larger powder second harmonic generation efficiency than that of analogous CLP crystals containing dimethylamino electron donor. A very high potential of OH1 crystals for broadband THz wave emitters in the full frequency range of 0.1-3 THz by optical rectification of 160 fs pulses has been demonstrated.

We show that OH1 exhibits excellent nonlinear optical and electro-optical properties. OH1 shows a large birefringence of $\Delta n > 0.55$ and a low absorption of $\alpha < 1$ cm$^{-1}$ in a large wavelength range between 800 and 1400 nm. The nonlinear optical coefficient for second-harmonic generation is $d_{333} = 120 \pm 10$ pm/V at the fundamental wavelength of 1.9 µm. The electro-optic coefficients $r_{333}$, $r_{223}$ and $r_{113}$ have been measured at the wavelengths of 633, 785, 1064, and 1319 nm. OH1 is a promising material for nonlinear optical and electro-optical applications due to the large nonlinear coefficient $d_{333}$, the large electro-optic coefficient $r_{333} = 75 \pm 7$ pm/V at 785 nm, the favorable crystal growth properties, as well as the orthorombic crystal symmetry (point group mm2) which renders crystal preparation and orientation much simpler than in most organic nonlinear optical crystals.

Phenolic CLP compounds 2-(3-(4-hydroxystyryl)-5-methylcyclohex-2-enylidene)malononitrile (with R1=CH$_3$, R2=H, n=1), designated as OH2, with one methyl group on the cyclohexene ring exhibit a broader transparency range from 600 to 1650 nm and powder second-harmonic generation efficiency of about twice as large than analogous OH1 crystals at 1.9 µm. While in OH1 crystals the main charge transfer axis of the chromophores is oriented at $\theta_p \approx 28°$ with respect to the polar axis, in OH2 crystals the chromophores are almost parallel with $\theta_p \approx 13°$, which is an optimal chromophore alignment for electro-optics with an order parameter close to 1 ($\cos^3 \theta_p = 0.92$). Phenolic CLP crystals OH3 without a methyl group on the cyclohexene ring (R1=H, R2=H, n=1) exhibit an isomorphic structure to OH2 crystals with $\theta_p \approx 13°$.

We have fabricated high optical quality single crystalline thin films of OH1 of very large area (>150 mm$^2$) and thickness between 0.05 and 20 µm on amorphous substrates, which are very suitable for fabrication of high-index contrast integrated optical structures like straight-waveguide phase modulators, Mach-Zehnder intensity modulators, microring resonators and photonic crystal structures.

A novel and promising technique is presented for the fabrication of electro-optically active single crystalline organic waveguides from OH1. We have developed optimized optical lithography and reactive ion etching processes for the fabrication of wire optical waveguides with dimensions of w×h=3.4×3.5 µm$^2$ and above. The technique is capable of producing low loss integrated optical waveguides with propagation losses well below 10 dB/cm and a high index contrast above $\Delta n = 1.16$. Electro-optic phase modulation in these waveguides has been demonstrated with a large electro-optic figure of merit n$^3$r of 1520±40 pm/V and 620±50 pm/V at 632.8 nm and 852 nm, respectively. Calculations have shown that an optimized electrode configuration can reduce the half-wave voltage×length product $V_\pi \times L$ from 8.4 Vcm, as obtained in our device, to 0.4 Vcm in the optimized case.

An alternative fabrication technique to grow single crystalline waveguides from the melt has been developed. The crystals are grown between two anodically bonded borosilicate glass wafers, which are structured and equipped with electrodes prior to bonding. Using this technique, we have also fabricated single crystalline polar nanowires and nanosheets with sub-30 nm thickness and length up to several millimeters.

The method according to the invention for growing a thin single crystal film of a configurationally locked polyene compound represented by the above formula I comprises the following steps: providing the compound in a liquid state, in particular in solution or in melt; providing the substrate; growing crystals on at least one surface of the substrate.

The substrate, for example a Silicon, Silicate glass (SiO$_2$), Borosilicate glass, polymer substrate, is preferably functionalized at least one surface, in particular by —OH, —CN, or —CH$_3$ groups. This may for example be achieved by treating the surface by solutions, e.g. with Piranha solution (mixture of H$_2$SO$_4$ and H$_2$O$_2$), or by silanization. The adhesive forces between in particular the OH1 compound and such a functionalized surface are very strong due to the highly polar phenolic OH-group. This facilitates formation of single crystal films on the substrate. Similar behavior is expected for OH2 and OH3.

The substrate may be unstructured (planar, homogenous material), for example a standard glass slide or Silicon wafer. It may also be a prefabricated substrate that comprises a surface structured with at least one recesses, and/or a surface structured with at least one projecting element. The substrate may also comprise electrically conductive elements, in particular electrodes, e.g. made of gold. In addition or as an alternative, it may also comprise at least two layers made of different material, e.g. a Si—SiO$_X$ combination. Structures may be provided in the outermost layer, such that for example projecting elements made of one material are arranged on an otherwise planar layer of another material. Such a prefabricated substrate is a good basis for manufacture of integrated optical elements (photonic elements) or plasmonic elements, wherein the single crystal layer is grown on the whole substrate or in certain regions thereof. The resulting optical element thus comprises at two or more materials with different conducting, dielectric, optical, and electro-optical properties, one of them the organic electro-optic material constituted by the CLP crystal.

The single crystal layer may be grown from solution or from melt. The compound OH1 is especially suited for crystal growth from solution, in particular methanol solution, by slow evaporation or by slow cooling. Very good results are observed when immersing the substrate partly in the solution, such that the substrate is oriented along or oblique with respect to the direction of gravity, in particular under an angle of 0-50°, and slowly evaporating the solvent. Due to capillary or adhesive forces, the surface of the substrate is wetted by the solution. At the upper end of the wetted surface area, local supersaturation of the solution occurs due to evaporation. Nucleation starts here. According to observations, for OH1 only those nucleation sites with local c-direction parallel to the substrate grow, leading to a single crystal layer with only few domains. Because OH1 has a large metastable zone in methanol solution of about 40° C. width, compared to about 7° C. for DAST, the quality of the crystal is very good (the crystal grows only at the very top of the area wetted by the solution which continuously descents because of evaporation of the solvent). The results of this method are enhanced by functionalizing the surface prior to immersion, as mentioned above.

Acentric OH2 and OH3 crystals have been grown from methanol and acetonitrile solution. Because of their thermal stability, melting and nucleation characteristics, the compounds OH2 and OH3 are especially suited to grow crystals from melt, using techniques like Czochralski, Bridgman- Stockbarger or zone melting to grow bulk crystals. The melt may be also applied to the surface of a planar substrate or may filled into the structures of a prefabricated substrate. In the latter case, structures of electro-optic material are achieved that may, in combination with the substrate, serve as photonic elements, e.g. waveguides, resonators and the like.

It is possible in both cases, i.e. crystal growth from solution or from melt, to apply the liquid between two neighboring substrates with a small gap in between, e.g. by utilizing capillary forces.

Another option is to further structure the single crystal layer after crystallization, e.g. by known processes like photolithography and etching. Further layers with appropriate optical properties may be applied to such a structured crystal layer, e.g. a polymer layer, electrodes, in order to form an integrated optical element.

An integrated optical element manufactured by this method comprises a substrate with at least one surface and at least one single crystal layer that covers the surface at least partially. Some preferred embodiments have already been described above in connection with the method.

In order to be able to modulate the electro-optic properties of the single crystal layer, the substrate preferably comprises at least one electrically conductive structure acting as electrode and being connectable to a voltage source. It is shown below that OH1 grows also on a substrate comprising gold or chromium electrodes.

Another method according to the invention is especially suited for growing a bulk single crystal of a predetermined thickness of the compound represented by the above mentioned formula (I). The method comprises the steps of providing the compound solved in a solvent; slowly evaporating the solvent or slowly cooling the solution; and controlling the thickness of the single crystal by controlling at least one of the following growth parameters: supersaturation, cooling rate, evaporation rate, temperature, pressure, amount of the solution, temperature gradients.

The morphology (thickness to side length ratio) of OH1 crystals can be for example controlled by choosing an appropriate cooling rate. Because of the high metastable zone width, there is a lot of freedom in choosing different supersaturation ratios during the growth; the concentration should only remain within the wide metastable zone ranges of the seeded solution to keep the high optical quality of the grown crystals. In general, a higher supersaturation ratio (achieved by a faster cooling rate) will give thicker OH1 crystals.

Single crystals of the compound represented by formula I are grown, which have a non-centrosymmetric structure, which is close to optimal for electro-optic applications and generation of THz waves in the 0.1-40 THz region by optical rectification or by difference-frequency generation.

Such material enables generation of THz waves for security applications, such as explosive, biothreat and weapon detection; for applications in material testing, such as detection of defects in paper, plastics and carton; and for material spectroscopy.

The electro-optic crystal has low absorption in the 0.1-3 THz wavelength range and with the velocity-matching condition fulfilled in this range, leading to high efficiency THz wave generation via optical rectification of femtosecond pulses.

The electro-optic crystal has electro-optic figure of merits $n^3r$ of more than 400 pm/V in the visible and infrared wavelength range.

The compound allows for fabrication of high optical quality single crystalline thin films of material of very large area (>150 mm$^2$) and thickness between 0.05 and 20 μm on amorphous or crystalline substrates.

According to the invention, low-loss high-efficiency active integrated and very large scale integrated photonic devices can be manufactured, such as waveguides, directional couplers, microring resonators, photonic bandgap structures, and sensing elements (for detecting e.g. molecules or liquids at the surface) fabricated in single crystalline electro-optic crystals.

According to the invention, also fabrication of single crystalline integrated optical structures, nanowires and nanosheets of configurationally locked polyene crystals grown from the melt inside pre-structured grooves is possible.

BRIEF DESCRIPTION OF THE DRAWINGS

FIG. 5: Few-cycle terahertz pulses generated in single crystals of OH1 (thickness 0.365 mm, solid line) and DAST (thickness 0.400 mm, dotted line) at a laser wavelength of 1460 nm. (a) Time-domain waveforms of the terahertz electric field E(t). (b) Their frequency spectra E(v).

FIG. 6: Dispersion of the refractive index for the three dielectric axes $n_1$, $n_2$, and $n_3$. The solid lines represent a least square fit to the data from a normal incidence transmission spectrum. The discrete data points represent the resulting refractive indices based on an interferometric measurement method. $n_1$ is constant within experimental error in the measured wavelength range (represented by the dashed curve).

FIG. 8: Crystal packing diagram of OH2 and OH3 crystals projected to the plane containing the charge transfer axis and the b-axis (a) and to the ac plane (b). The solid and dotted vectors present the directions of the maximum first hyperpolarizability $\beta_{max}$ and the dipole moment μ of four OH2 or OH3 molecules in the unit cell as determined by finite-field (FF) calculations, respectively. The angle between the main charge-transfer axis of the crystal and hyperpolarizabilities $\beta_{max}$ of the molecules is $\theta_p$=13.3° (ψ=75°) for OH2 and $\theta_p$=13.0° (ψ=75°) for OH3.

μm). c) UV-exposure and development of SU8 photoresist. (Microscope image in FIG. 11a)). d) Optimized pattern transfer by RIE leads to well defined OH1 single-crystalline wires, shown in FIG. 11b) from the top.

Figure 11:
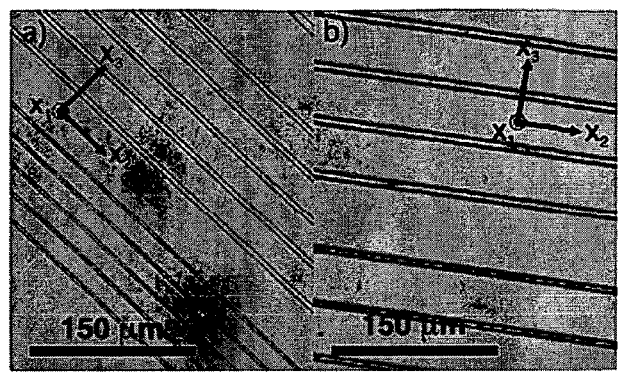

FIG. 11: a) Microscope image of the developed SU8 photoresist on the protected OH1 single crystalline thin film. b) Fabricated single crystalline OH1 wires on glass after complete removal of the resist layer by reactive-ion etching.

Figure 12:
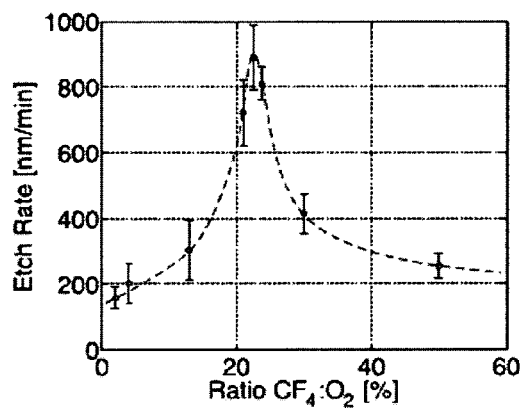

FIG. 12: Etch rate of OH1 at 200 W rf-power as a function of the ratio of additional $CF_4$ in the flow of $O_2$ as etch gas. The total gas flow was 52 sccm for all measurements, whereas the chamber pressure was kept at 200 μbar. The dashed curve was added for a better visualization of the experimental data.

Figure 13:
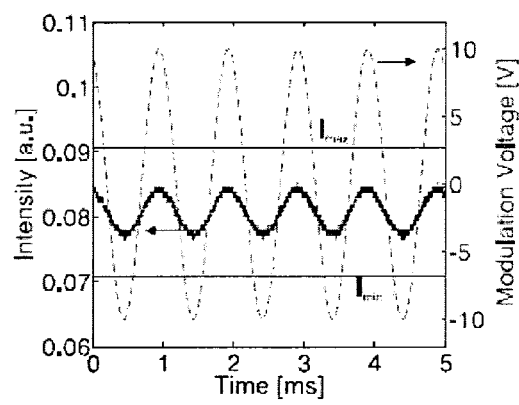

FIG. 13: Electro-optic phase modulation measured in a 1.0 mm long, single-crystalline waveguide of OH1. The applied voltage (dashed) has an amplitude of 10 V and was modulated at a frequency of 1 kHz. The resulting maximized modulation of the light intensity (solid) was also detected by a lock-in amplifier. Imax and Imin represent the intensities for maximum constructive and destructive interference obtained in the given measurement, respectively.

Figure 14:
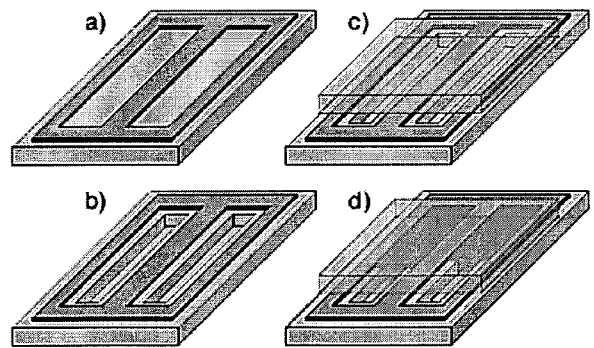

FIG. 14: Processing steps for the fabrication of electrode equipped waveguide channels. a) 40 nm chromium and 50 nm amorphous silicon were deposited and structured on a borosilicate wafer by standard photolithography. b) The straight waveguide structure was patterned in-between neighboring chromium/silicon stripes by reactive ion etching. c) A cover borosilicate glass was anodically bonded to the fabricated structure to delimit the waveguide volume in vertical direction. d) The cover glass was shorter than the waveguide length, such that the fabricated channels were accessible for the melt and the material could flow in by capillary action and crystallize there.

Figure 15:
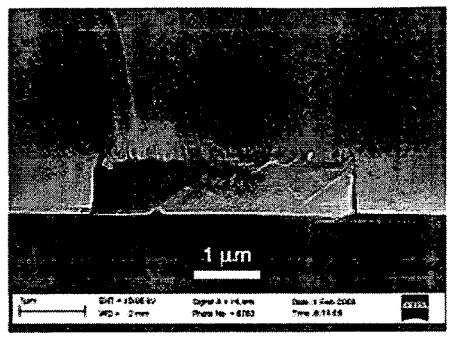

FIG. 15: Scanning electron micrograph of an end-facet of a melt grown crystal inside a glass groove.

Figure 16:
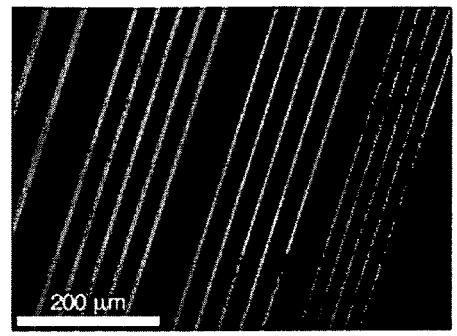

FIG. 16: Transmission microscope image of approximately 25 nm thick organic crystalline stripes grown from the melt as seen between crossed polarizers. The corresponding end-facet is shown in FIG. 17.

Figure 17:
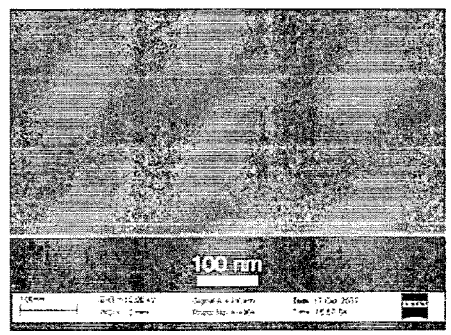

FIG. 17: Scanning electron micrograph of an end-facet of an approximately 25 nm thick CLP crystal grown from the melt.

Figure 18:
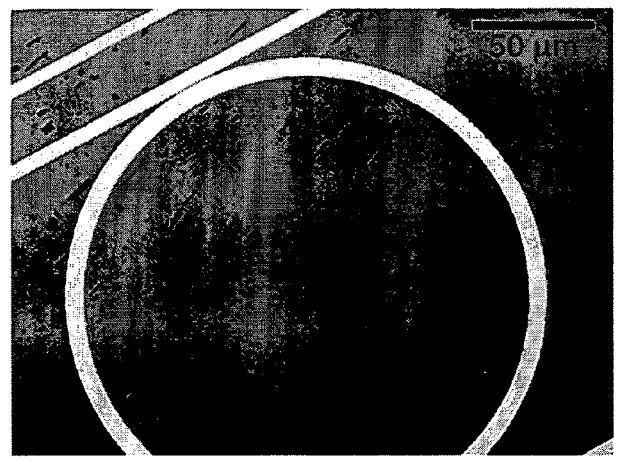

FIG. 18: Transmission microscope image of an approximately 90 nm thick crystalline nanosheet grown from the melt as seen between crossed polarizers. The black spots indicate regions without crystalline material. Two crystalline domains can be seen as noticeable in the lower right corner, where the crystal orientation rotates by 11±1°. Grooves of any shape structured in the substrate borosilicate glass can be efficiently filled by flowing the melt through nanosize channels to the structure, a 0.5 μm deep microring resonator structure in this case. The orientation of the crystal in the ring-structure is the same as throughout the entire single crystalline domain.

Figure 19:
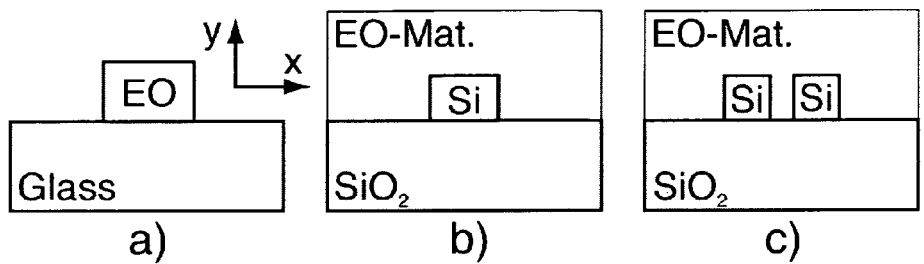

FIG. 19: Electro-optically active waveguide structures. a) Electro-optically active waveguide core. b) and c) SOI based waveguide structures with silicon as core material. The active cladding material above (b) and between (c) the silicon structures is responsible for the electro-optic tuning of the guided modes.

Figure 20:
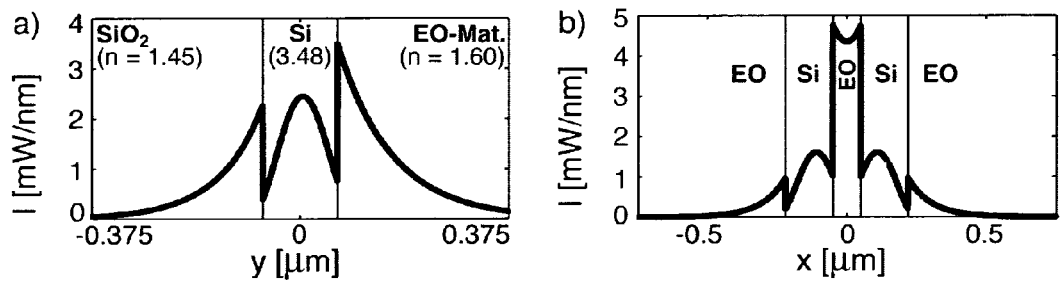

FIG. 20: Intensity profile of the TM-(a) and TE-modes (b) in the SOI waveguide structures of type b) and c) of FIG. 19, respectively. A large part of the modal intensity is guided in the electro-optically active material.

Figure 21:
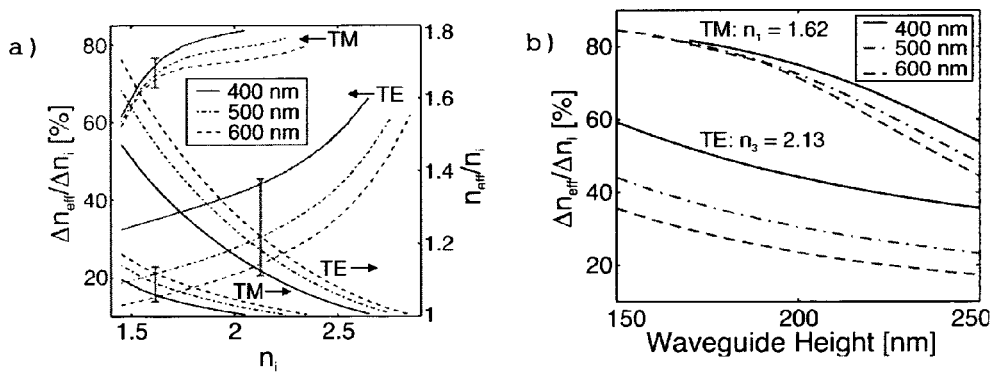

FIG. 21: a) Cladding modulation efficiency $\xi_{n_i}$ of silicon wire waveguides as a function of the refractive index of the cladding material $n_t$ (h=200 nm, w=400, 500, and 600 nm). b) Cladding modulation efficiency with OH1 as cladding material dependent on waveguide height h.

Figure 22:
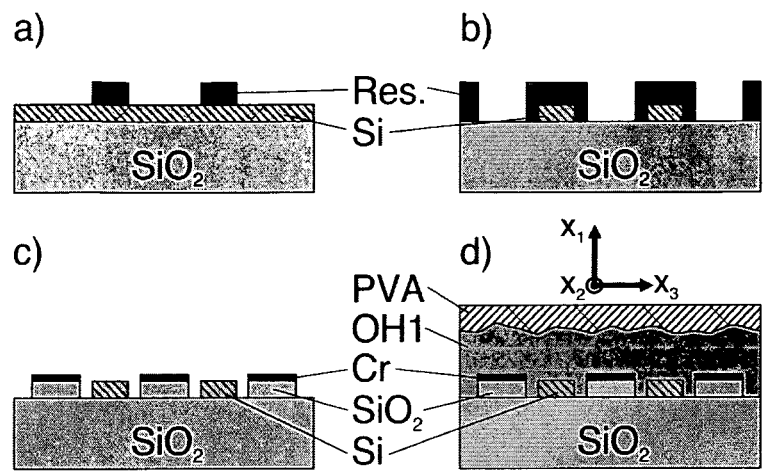

FIG. 22: Process steps for the fabrication of an electro-optically active MZ-interferometer based on the SOI waveguide technology. a) Waveguide patterning using optical lithography. b) Second lithography step for electrode patterning after reactive-ion-etching. c) Deposition of 50 nm thick Chromium electrodes on 200 nm $SiO_2$ and lift-off. d) Growth of the electrocoptic single crystalline thin film with OH1, and spin-coating of the PVA protection layer.

Figure 23:
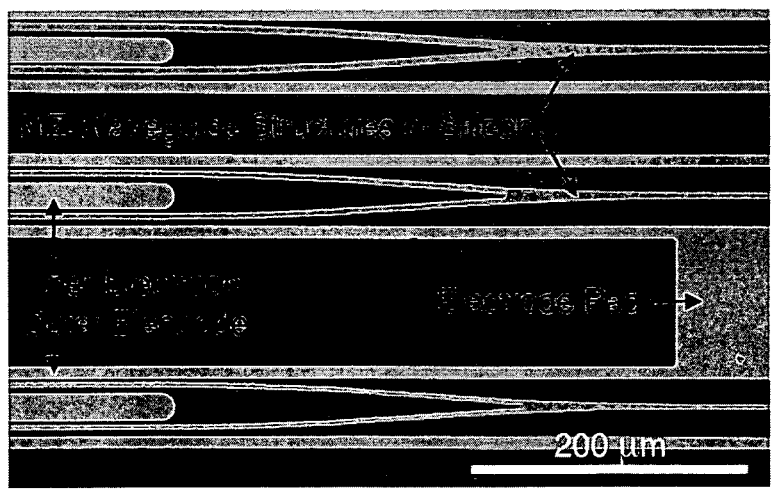

FIG. 23: SOI substrate with patterned Mach-Zehnder waveguide structures in Silicon and deposited metal electrodes. Single-crystalline thin films of OH1 have subsequently been grown on top of these substrates, in order to provide an electro-optically active cladding.

Figure 24:
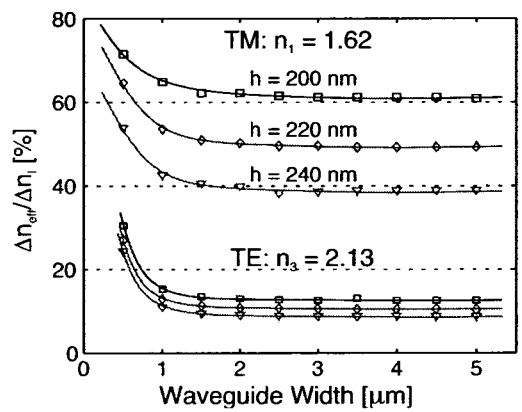

FIG. 24: Numerically simulated efficiencies $\xi_{n_i} = \partial n_{eff} / \partial n_i|_{n_{1/3}}$ for TM and TE fundamental modes guided in SOI wire waveguides with OH1 as the electro-optic cladding material. For widths w>1 μm, $\xi_{n_i}$ remains constant.

Figure 25:
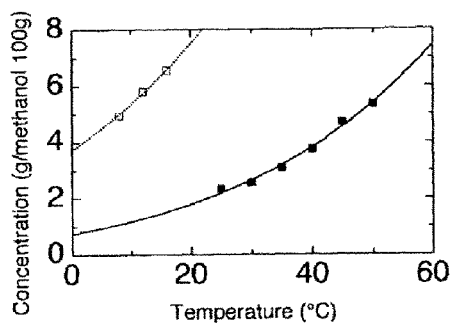

FIG. 25. OH1 solubility curve (solid line) and the metastable-zone boundary (dotted line) measured in methanol solvent.

Figure 26:
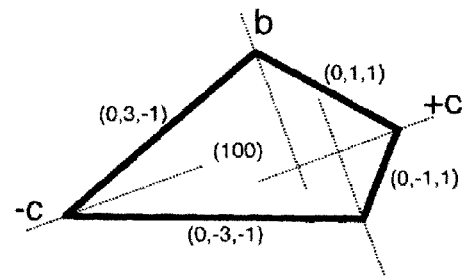

FIG. 26. Morphology/crystal faces of a spontaneously grown OH1 crystal.

Figure 27:
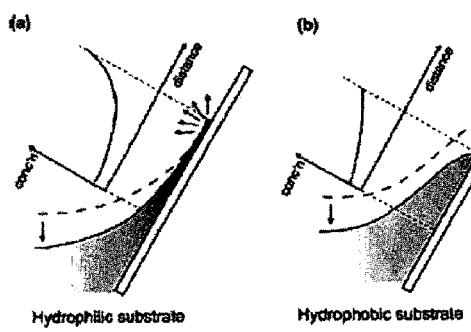

FIG. 27. Schematic illustration of evaporation-induced local supersaturation with surface interactions (ELSSI): (a) hydrophilic solution on hydrophilic surface (OH- and CN-modified surfaces) and (b) on hydrophobic surface ($CH_3$-modified surface).

Figure 28:
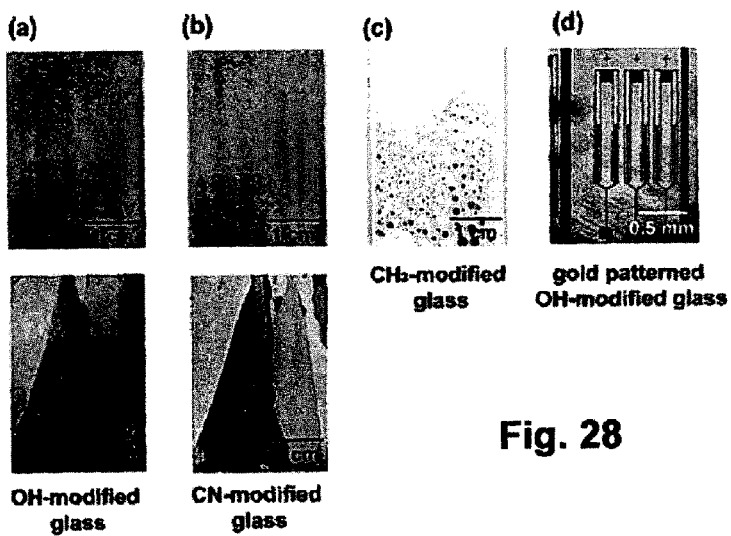

FIG. 28. OH1 crystals grown on OH-modified (a), CN-modified (b), $CH_3$-modified (c) and gold-patterned and OH-modified (d) glass substrates; black lines are gold electrodes. The images below are photographs of the films from above between crossed polarizers; single-crystalline domains can be observed.

FIG. 29. (a) X-ray diffraction pattern in reflection mode of OH1 thin film grown on OH-modified substrate. (b) Self-assembly and crystal packing diagram of OH1 molecules on OH-modified substrate. Hydrogen bonds between the OH1 molecules and the glass surface are presented by dotted lines.

FIG. 30. Transmittance curve of a grown OH1 thin film of 2.2 μm thickness on OH-modified glass substrate for light polarized along the c-axis.

FIG. 31. Film thickness as a function of the solution concentration at the nucleation point (small squares) and at 3 cm from the nucleation point (large squares); the lines are guides to the eye.

Figure 32:
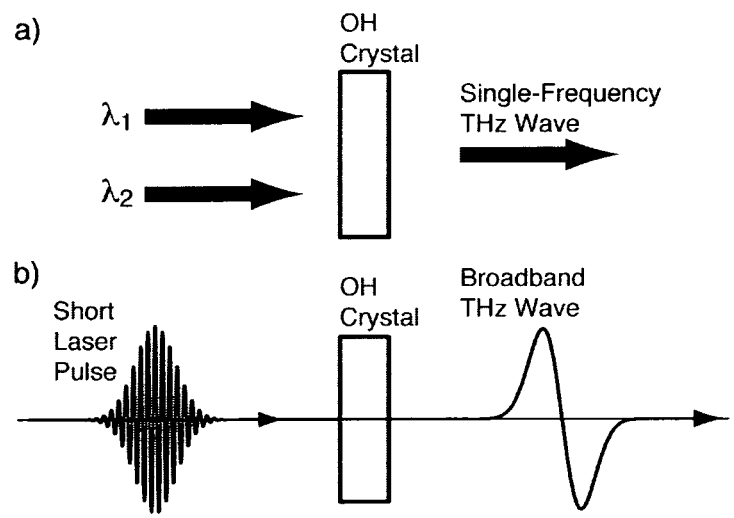

FIG. 32: Terahertz-wave generation by difference-frequency generation (FIG. 32a) and by optical rectification (FIG. 32b).

Figure 33:
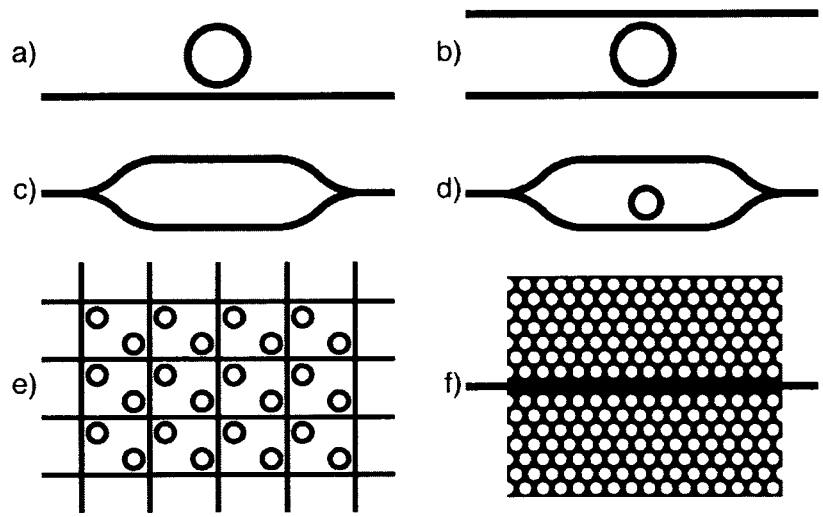

FIG. 33: Examples for different integrated optical devices.

DESCRIPTION OF THE PREFERRED EMBODIMENTS

2. Phenolic Configurationally Locked Crystals OH1

2.1 Synthesis and Characterization

The chemical structure of the investigated OH1 chromophore with phenolic electron and hydrogen bond donor is shown in the following Scheme:

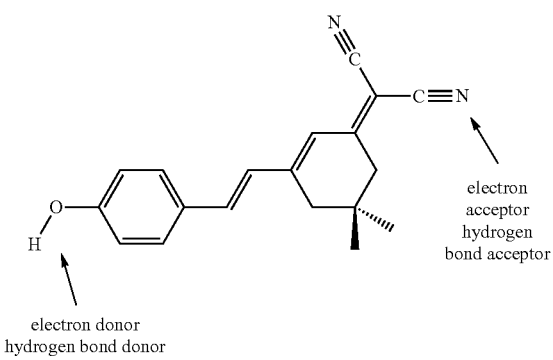

electron donor
hydrogen bond donor

The OH1 chromophore consists of the configurationally locked π-conjugated hexatriene bridge linked between phenolic electron donor and dicyanomethylidene [>C=C(CN)$_2$] electron acceptor, which can also act as hydrogen bond donor and acceptor site, respectively. The OH1 chromophore was synthesized by consecutive Knoevenagel condensations [16]. For introducing phenolic electron and hydrogen bond donor sites 4-hydroxybenzaldehyde was used for the synthesis. In order to retain high thermal stability and the tendency for inducing an acentric packing, structurally asymmetric groups were incorporated in the cyclohexene ring of the OH1 chromophore as demonstrated in some previously studied CLP crystals [13, 17, 14]. The product was purified several times by recrystallization in methanol.

The results of the physical characteristics, including the thermal properties, absorption properties, macroscopic nonlinearity and crystal properties of OH1 crystals are summarized in Table 1 and compared to the analogue polyene DAT2 crystal [13] and the state-of-the-art organic nonlinear optical crystal salt DAST [11, 18, 12].

Figure 1:
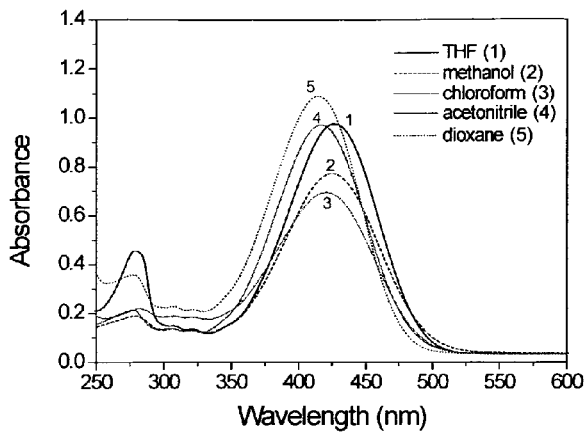
FIG. 1: Absorption spectra of OH1 molecule in different solvents: THF (1, $\lambda_{max}$=427 nm), methanol (2, $\lambda_{max}$=425 nm), chloroform (3, $\lambda_{max}$=421 nm), acetonitrile (4, $\lambda_{max}$=417 nm) and dioxane (5, $\lambda_{max}$=414 nm).

FIG. 1 shows the absorption spectra of OH1 molecules in various polar and nonpolar solvents. The wavelength of the maximum absorption $\lambda_{max}$ is considerably shifted depending on the environmental conditions (i.e. on the different solvents): 427 nm in THF, 425 nm in methanol, 421 nm in chloroform, 417 nm in acetonitrile, and 414 nm in dioxane. This can be attributed to intermolecular hydrogen bond formation between the phenolic group of the OH1 molecule and the solvent. This binding is affecting the electron donating strength and results in a change of the wavelength of maximum absorption $\lambda_{max}$.

TABLE 1

Comparison of crystal properties for the OH1 crystals, analogous DAT2 crystals, and the state-of-the-art organic nonlinear optical crystal salt DAST.

| | OH1 | DAT2 | DAST |
|---|---|---|---|
| Wavelength of maximal absorption | 423 (chloroform) | 502 (chloroform) | 475 (methanol) |
| CRYSTAL SYSTEM | orthorhombic | monoclinic | monoclinic |
| SPACE GROUP | Pna2$_1$ | P2$_1$ | Cc |
| POLAR AXIS | c-axis | b-axis | a-axis |
| USUAL HABIT | a-plate | c-plate | c-plate |
| crystal quality: spontaneous growth | excellent | good | good |
| solubility at 40° C. (g/100 g methanol) | 3.74 | <0.01 | 3.73 |
| bulk crystal growth | easy | difficult | moderate |
| polymorph | no | no | centrosymmetric hydrate |
| thermal weight-loss temperature T$_i$ | 325° C. | 293° C. | 250° C. |
| melting temperature T$_m$ | 212° C. | 233° C. | 250° C. (≈T$_i$) |
| T$_m$ possibility for melt-based growth | possible (ΔT = 113° C.) | Possible (ΔT = 60° C.) | very difficult (ΔT ≈ 0° C.) |
| POWDER SHG AT 1.9 μM | 4 | 1 | 8 |
| ELECTRO-OPTIC COEFFICIENT | r$_{333}$ = 52 pm/V at 1.3 μm | — | r$_{111}$ = 53 pm/V at 1.3 μm |
| cut-off wavelength | <640 nm | — | <680 nm |
| solubility in water | insoluble | insoluble | soluble |

Powder SHG measured at a fundamental wavelength of 1.9 μm relative to that of DAT2 powder (about two orders of magnitude larger than that of urea).

The thermal stability of the OH1 chromophore was investigated using thermogravimetric analysis (TGA) and differential scanning calorimetry (DSC) under nitrogen atmosphere (scan rate: 10° C./min). The melting temperature T$_m$ is defined here as the peak position in the DSC scan. The thermal weight-loss temperature T$_i$ estimated as the temperature at the intercept of the leading edge of the weight loss by the base line of the TGA scans. The OH1 chromophore exhibits a very high weight-loss temperature T$_i$ of 325° C., which involves sublimation and/or decomposition. The OH1 crystals exhibit a large temperature difference ΔT of about 113° C. between the thermal weight-loss temperature T$_i$ and the melting temperature T$_m$. The high thermal stability of OH1 crystals is an advantage for applying a melt-based crystal growth that is difficult for the ionic salts, e.g. DAST that decomposes at the melting temperature.

2.2 Large Size Bulk Single Crystals

CLP crystals studied previously are soluble in polar solvents such as acetone, acetonitrile and dimethylformamide and in a nonpolar solvent methylenechloride, while the solubility in methanol or ethanol is too low for growing bulk crystals [13, 17, 14]. Due to the highly polar phenolic OH group, the OH1 crystals are well dissolved in methanol, compared to, e.g., DAT2 crystals that have a dimethylamino group and exhibit poor solubility as listed in Table 1. The higher solubility of OH1 crystals is of advantage for solution growth because of a better material transport leading to faster growth rates and/or larger crystal dimensions.

Figure 2:
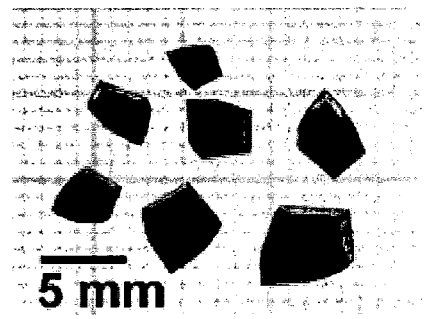
FIG. 2: Bulk OH1 crystals grown in methanol solution by the slow evaporation method.

We grew easily large size bulk OH1 crystals by slow evaporation in methanol solution at 30° C. We did not observe any hydrated phase of OH1 crystal during the crystal growing process. The growth procedure was very simple and the growth process has not been optimized yet. In the beginning, several crystals nucleated at the bottom of an open glass container and then continued to grow during 10 days. FIG. 2 shows a photograph of the resulting OH1 single crystals. As-grown OH1 crystals exhibit excellent optical quality and large size with a maximal side length of up to 1 cm. The thickness of the crystals is in the range of 0.1-2 mm. The grown OH1 crystals are of sufficient size and thickness for nonlinear optical experiments including THz wave generation. Moreover, non-ionic type OH1 crystals are insoluble in water, in contrast to highly soluble ionic DAST crystals, which easily form a centrosymmetric hydrated phase with water. Therefore, OH1 crystals possess better environmental stability, and allow for wet structuring processes. After growing, the larger surfaces of the crystals were polished to λ/4 surface quality for optical characterization.

2.3 Crystal Structure

The crystal structure of OH1 grown from methanol solution was determined by X-ray diffraction. The grown OH1 crystals have a noncentrosymmetric structure, orthorhombic with space group symmetry Pna2$_1$ and point group symmetry mm2.

The main supramolecular interactions of the OH1 crystals are strong hydrogen bonds of C≡N . . . H—O with a H . . . N distance of about 2.12 Å. With the help of these two hydrogen bonding sites at opposite ends, nearly planar OH1 molecules build a hydrogen-bonded polar polymer-like chain in the crystalline solid. The polar polymer-like chains are stacked up one by one, forming acentric layers. The polar direction of the acentric layers makes an angle of about 20° with the polar crystallographic c axis in the bc plane (see FIG. 3).

OH1 crystals feature a relatively high point-group symmetry compared to other organic crystals. They belong to the orthorhombic crystal system, for that the dielectric axes coincide with the crystallographic axes. This is of advantage since it allows a much simpler crystal preparation and orientation for optical characterization and applications. Most of the known highly nonlinear optical crystals feature lower crystal symmetry, typically crystallizing in monoclinic crystal systems: for example DAT2 [13], PyM3 [14], and DAST [18, 19].

2.4 Transparency Range

Figure 4:
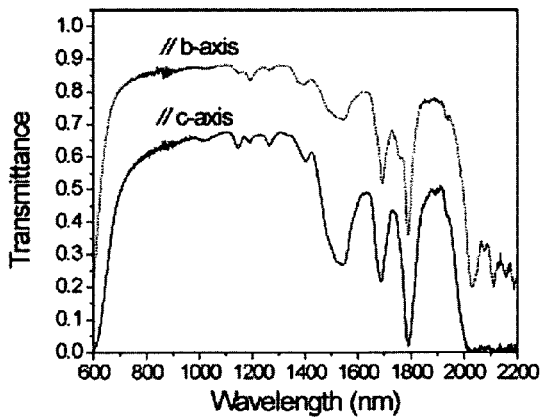
FIG. 4: Transmission spectra of a polished OH1 crystal (a-plate) with a thickness of 1.44 mm for the incident light polarized parallel to the crystallographic b- and the polar c-axis.

The transmission spectra of a polished OH1 crystal (a-plate) with a thickness of 1.44 mm was measured for the incident light polarized parallel to the crystallographic b- and c-axis and is shown in FIG. 4. OH1 crystals exhibit a large transparency range from 700 to 1400 nm. Three absorption bands observed in the infrared region at about 1.5, 1.7, and 1.8 μm correspond to overtones of the O—H and C—H stretching vibrations. The absorption edge is shifted to shorter wavelength by about 40 nm with respect to the one in DAST [12]. The larger transparency range in the visible and the lower cut-off wavelength of OH1 crystals can be used for applications in the red and near-IR wavelength range and may also lead to a better photostability [8].

2.5 Microscopic and Macroscopic Optical Nonlinearities in the Crystallographic System The macroscopic second-order susceptibilities $\chi^{(2)}$ can be estimated from the microscopic first hyperpolarizabilities $\beta^{ijk}$ using the oriented gas model, giving e.g. for second-harmonic generation [1]

$$\chi_{ijk}^{(2)}(-2\omega,\omega,\omega) = N f_i^{2\omega} f_j^{\omega} f_k^{\omega} \beta_{ijk}^{eff}(-2\omega,\omega,\omega), \quad (1)$$

where N is the number of molecules per unit volume and $f_i^\omega$ are the local filed correction factors. The effective $\beta_{ijk}^{eff}$ coefficients in the crystal can be calculated from the hyperpolarizability tensor components $\beta_{mnp}$ of the molecules as $$\beta_{ijk}^{eff} = \frac{1}{n(g)} \sum_{s}^{n(g)} \sum_{mnp}^{3} \cos(\theta_{im}^s)\cos(\theta_{jn}^s)\cos(\theta_{kp}^s) \beta_{mnp}, \quad (2)$$

where n(g) is the number of equivalent positions in the unit cell, s denotes a site in the unit cell, and $\theta_{im}^s$ is the angle between the Cartesian axis i and the molecular axis m.

The first hyperpolarizability β was determined experimentally by electric field induced second harmonic generation measurements (EFISH) at the wavelength 1907 nm As listed in Table 2, the molecular hyperpolarizability $\beta_z$ measured by EFISH for the OH1 chromophore varies considerably in different solvents, chloroform and dioxane. We attribute this difference to different intermolecular interactions between the OH1 molecules and the solvent molecules, inducing a change of the electron donating strength, changing also the wavelength of maximum absorption $\lambda_{max}$.

TABLE 2

Hyperpolarizabilities $\beta_z$ and dipole moments $\mu_g$ for OH1 and DAT2 molecules.

| environmental condition | | $\lambda_{max}$ (nm) | $\mu_g$ ($10^{-29}$ Cm) | $\beta_z$ ($10^{-40}$ m$^4$V$^{-1}$) |
|---|---|---|---|---|
| OH1 | chloroform | 421 [a] | 3.44 [a] | 765 [a] |
|  | dioxane | 414 [a] | 2.20 [a] | 375 [a] |
|  | OPT (cal.) | 415 [b] | 3.80 [c] | 314 [c] |
|  | EXP (cal.) | 395 [b] | 3.65 [c] | 279 [c] |
| DAT2 | chloroform | 502 [a] | 3.21 [a] | 1100 [a] |
|  | OPT (cal.) | 468 [b] | 4.67 [c] | 825 [c] |
|  | EXP (cal.) | 463 [b] | 4.57 [c] | 834 [c] |

[a] from the measurements,
[b] from TD-DFT calculation.
[c] from FF calculation.

Figure 3:
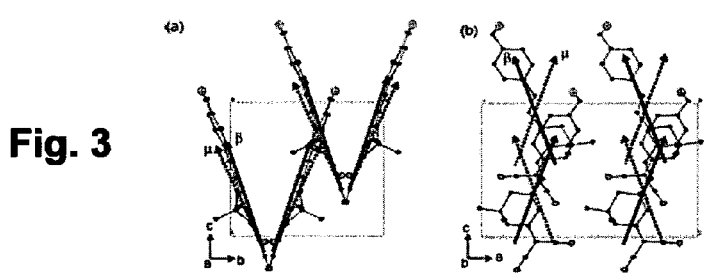
FIG. 3: (a) Crystal packing diagram of OH1 crystal projected along the a-axis (a) and along the b-axis (b). The solid and dotted vectors present the directions of the maximum first hyperpolarizability $\beta_{max}$ and the dipole moment μ of four OH1 molecules in the unit cell as determined by finite-field calculations, respectively. Hydrogen atoms excluding those on OH group are omitted for clarity.

As illustrated in FIG. 3, the OH1 molecules in the crystalline state have a large angle of about 42° between the direction of the maximum first hyperpolarizability $\beta_{max}$ and the dipole moment μ. The direction of the maximum first hyperpolarizability $\beta_{max}$ of the OH1 molecules is aligned at a small angle of $\theta_p = 28°$ with the polar c-axis. We therefore expect a large macroscopic nonlinearity of OH1 crystals. The Kurtz and Perry powder test was performed at the fundamental wavelength of 1.9 μm. We compared the second harmonic generation (SHG) signal with the signal generated by the DAT2 crystalline powder, which possesses two orders of magnitude greater SHG efficiency than urea.[9] OH1 crystals exhibit very strong SHG signal that is about 4 times larger than the one of DAT2, despite of the lower microscopic molecular nonlinearity (see Table 2).

The reason for the about four times higher SHG efficiency of the OH1 crystals compared to the analogous DAT2 crystals can be related to the ordering of the chromophores in the crystalline lattice [1].

The maximum diagonal coefficient $\beta_{iii}^{eff}$ can be estimated as $\beta_{max} \cos^3\theta_p$. For DAT2 the angle $\theta_p$ between the main direction of the first-order hyperpolarizability and the polar axis was quite large (82°) and for MH2 with the highest powder SHG efficiency it was still 67° [14]. Therefore, the order parameter $\cos^3\theta_p$ is considerably improved in OH1 crystals and this is the first CLP crystal with a highly polar alignment of the chromophores. The maximal component of the effective hyperpolarizability tensor $$\beta_{ijk}^{eff} \propto \chi_{ijk} \quad (2)$$

is by a factor of about two larger in OH1 compared to DAT2. Therefore, larger components of $\beta_{ijk}^{eff}$ lead to a considerably higher SHG efficiency of OH1 crystals.

3. Terahertz Generation

Terahertz time-domain spectroscopy is a powerful technique for an increasing number of applications [5, 6]. It relies on few-cycle pulses of electromagnetic radiation with a spectral content in the 0.1 to 5 THz range that can be generated through optical rectification of sub-picosecond pump laser pulses in second-order nonlinear optical materials. Organic crystals such as DAST have been demonstrated to be very efficient emitters of terahertz pulses [20, 21, 22]. We have generated few-cycle terahertz pulses in single crystals of OH1 and compared them to pulses from DAST under identical experimental conditions. The 160 fs pump laser pulses stem from an optical parametric amplifier pumped by an amplified Ti:Sapphire laser. We chose a central wavelength of 1460 nm for the pump pulses to ensure phase-matched optical rectification in DAST. The terahertz pulses were coherently detected through electro-optic sampling in a ZnTe crystal using probe pulses at 730 nm [20].

FIG. 5 shows a quasi single-cycle terahertz pulse emitted from OH1. Its peak amplitude (at t=0) exceeds that from DAST by 38% despite the shorter crystal length (OH1: 0.365 mm, DAST: 0.400 mm). The terahertz pulse energy from OH1—proportional to the time integral of the square of the amplitude in FIG. 7a—was 8% larger than that from DAST. A significant difference between the two emitter materials is observed in the frequency spectra of their time-domain waveforms as shown in FIG. 7b. DAST suffers from a phonon resonance centered at 1.1 THz that leads to an increased absorption and consequently to a drastically lower amplitude emitted at this frequency. Apparently, there is no such resonance in OH1 which leads to a relatively smooth spectrum from 0.1 to 3 THz. These results demonstrate that OH1 has a very high potential as a source of terahertz radiation, especially considering that these measurements were done with a pump wavelength that is optimized for DAST and not for OH1. The efficiency of terahertz generation from OH1 can still be improved using the proper phase-matching conditions.

4. Linear and Nonlinear Optical Properties of OH1

4.1 Crystal Properties

OH1 single crystals were grown by slow evaporation of methanol as a solvent. Crystals with good optical quality were obtained with dimensions up to 4×4×2 mm³ by the slow evaporation technique. Additionally we have grown thin films with the capillary method [23, 15] between two glass substrates with dimensions up to 3×3 mm² and thicknesses between 5 and 100 μm. Although, thin film growth of organic electro-optic crystals is generally a challenge and far from trivial, e.g. for DAST [24, 23], high quality OH1 thin films could be grown. X-ray analysis has shown that both bulk and thin film crystals grown from methanol, form plates with the largest surface perpendicular to the a-axis. Optical analysis of the crystal between crossed polarizers in combination with the measurement of angles between the naturally grown facets allows the full orientation of the crystal with respect to its dielectric axes. For optical measurements, thin-film crystals were used as grown, while bulk-crystal bc-surfaces were polished to $\lambda/4$ surface quality.

4.2 Refractive Indices

The refractive indices of OH1 have been determined by two independent methods. The first one is based on a normal incidence transmission spectrum of a crystalline thin film, measured with a Perkin-Elmer Lambda9 spectrophotometer. The spectrum features 60 to 100 interference fringes in the wavelength range from 600 to 2200 nm due to multiple coherent reflections in the film. A thin film with a thickness d=10 μm was used for this measurement; the thickness was determined by a Tencor Alphastep P11 profilometer yielding an accuracy of ±20 nm. The relation for a fringe maxima is simply the expression for constructive interference after one roundtrip in the thin film.

Figure 7:
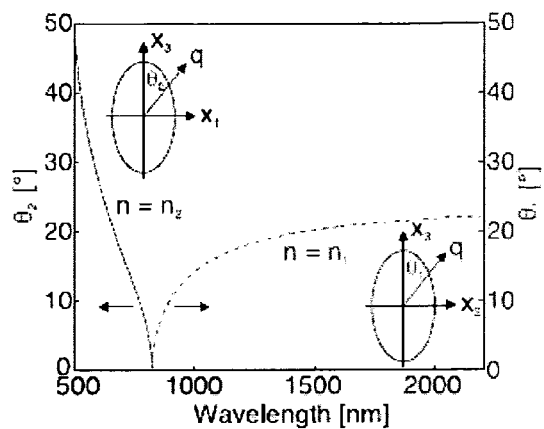
FIG. 7: Calculated orientation of the optical axes in OH1. The crystal becomes uniaxial at the wavelength $\lambda^*$=820 nm. For $\lambda<\lambda^*$ the optical axes lie in the $x_1x_3$-plane at an angle $\pm\theta_2(\lambda)$ from the polar $x_3$-axis. For $\lambda>\lambda^*$ the optical axes lie in the $x_2x_3$-plane at an angle $\pm\theta_1(\lambda)$, as indicated.

The second method is based on an interferometric measurement [25, 26]. The 1.5 mm thick sample was placed on a rotation stage in one arm of a Michelson interferometer. An intensity modulation as a function of the rotation angle ϕ can be detected due to constructive and destructive interference of the two interferometric arms as the effective pathlength of the light in the crystal is changed. Similar to the first measurement method described above, only the angles with maximum intensity were extracted and used for the determination of the refractive index. Besides the refractive indices $n_2$ and $n_3$, also $n_1$ can be determined using p-polarized light. The measurement was performed at three different wavelengths, i.e. 633, 785, and 1319 nm. FIG. 6 shows the results obtained from both measurement methods. OH1 features a large birefringence for light polarized along the polar axis $x_3$ and the other two axes. $\Delta n$ is larger than 0.5 in the whole wavelength range up to 2.2 μm. At $\lambda^*=820$ nm the crystal is uniaxial since the refractive index $n_1$ matches $n_2$ at this wavelength. FIG. 7 shows a calculation of the orientation of the optical axes as a function of $\lambda$. For wavelengths below $\lambda^*$ the optical axes lie in the $x_1x_3$-plane at an angle $\pm\theta_2(\lambda)$ from the polar $x_3$-axis. For $\lambda>\lambda^*$ the optical axes lie in the $x_2x_3$-plane at an angle $\pm\theta_1(\lambda)$.

4.3 Nonlinear Optical Properties

The nonlinear optical tensor elements were measured by the standard Maker-fringe technique generalized for anisotropic absorbing materials [27]. All measurements were performed relative to quartz with $d_{111}=0.277$ pm/V at 1.9 μm [28]. As expected, the nonlinear optical tensor element $d_{333}=120\pm10$ pm/V is the largest, owing to the preferential alignment of the chromophores along the $x_3$-axis of the crystal. This coefficient is about 60% of the largest tensor element $d_{111}=210\pm55$ pm/V of DAST [28].

4.4 Electro-optic Coefficients

The electro-optic coefficients $r_{223}$ and $r_{333}$ have been determined by the widely known phase modulation technique using a Mach-Zehnder interferometer [26]. The results of these measurements are shown in Table 3. The coefficients $r_{333}=75\pm8$ and $52\pm7$ pm/V have been measured at a wavelength of 785 and 1319 nm, respectively. These values are within experimental errors the same as the electro-optic coefficients $r_{111}=77\pm8$ and $53\pm6$ pm/V at 800 and 1313 nm, respectively, measured in DAST [12]. The electro-optic figure of merit for OH1 is $n_3^3 \cdot r_{333}=970\pm100$ pm/V and $2070\pm80$ pm/V at 785 and 632.8 nm, respectively, which is among the largest ones measured in organic materials. This is the first time that figures of merits of this order of magnitude have been obtained in organic hydrogen-bonded crystals.

TABLE 3

Electro-optic coefficients of OH1.

| λ [nm] | 632.8 | 785 | 1064 | 1319 |
| --- | --- | --- | --- | --- |
| $r_{223}$ [pm/V] | 90 ± 6 | 52 ± 3 | 35 ± 2 | 30 ± 2 |
| $r_{333}$ [pm/V] | 109 ± 4 | 75 ± 7 | 56 ± 2 | 52 ± 7 |

The electric field was applied in the $x_3$-direction and modulated at a frequency of 1 kHz. The values are comparable to the largest coefficients of the well known organic salt DAST.

5 Phenolic Configurationally Locked Crystals OH2 and OH3

The chemical structures of the investigated CLP chromophores with phenolic electron and hydrogen bond donor are shown in the following Scheme:

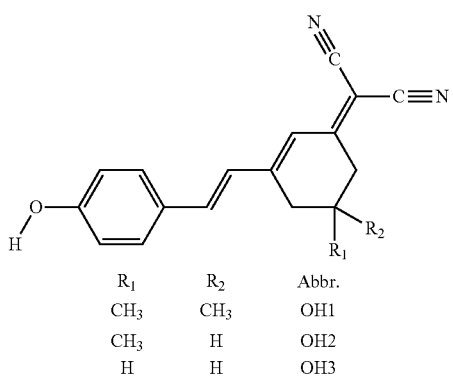

| $R_1$ | $R_2$ | Abbr. |
|---|---|---|
| $CH_3$ | $CH_3$ | OH1 |
| $CH_3$ | H | OH2 |
| H | H | OH3 |

The chromophores consist of the configurationally locked π-conjugated hexatriene bridge linked between phenolic electron donor and dicyanomethylidene [>C=C(CN)$_2$] electron acceptor, which also act as hydrogen bond donor and acceptor, respectively. These two hydrogen bonding sites at opposite ends of the molecules will enforce the head-to-tail supramolecular organization with hydrogen bonds of —OH . . . NC— groups. The phenolic CLP chromophores were synthesized by Knoevenagel condensations according to literature. The materials were purified by recrystallization in methanol or ethylacetate.

The results of the physical characteristics, including the thermal properties, absorption properties, macroscopic nonlinearity and crystal properties of non-ionic CLP crystals are summarized in Table 4 and compared to the ionic organic crystal DAST. The microscopic and macroscopic nonlinearities, i.e. the maximal first-order hyperpolarizability $\beta_{max}$ and the effective hyperpolarizability tensor $\beta_{ijk}^{eff}$ coefficients were calculated by quantum chemical calculations.

Single crystals of the investigated phenolic CLP derivatives were grown from methanol or acetonitrile solution by the slow evaporation method at 30 or 45° C. For screening the macroscopic nonlinearity of the phenolic CLP crystals the Kurtz and Perry powder test was performed at a fundamental wavelength of 1.9 μm by measuring the reflected second harmonic generation (SHG) efficiency. All phenolic CLP crystals exhibit strong SHG activities. The powder SHG efficiency of OH3 crystals is comparable to that of OH1 crystals. Moreover, the OH2 crystalline powder exhibits the SHG powder efficiency twice as large as OH1 powder and comparable to DAST powder. Therefore all phenolic CLP crystals investigated here are attractive for second-order nonlinear optical applications.

Single crystal structures for the phenolic CLP crystals were determined by X-ray diffraction and are given in Table 4. The phenolic CLP crystals OH2 and OH3 have a monoclinic with space group symmetry Cc (point group m). The main supramolecular interactions of the phenolic CLP crystals OH1, OH2 and OH3 are strong hydrogen bonds of C≡N . . . H—O With the help of these two hydrogen-bonding sites at opposite ends, OH molecules build head-to-tail hydrogen bonds in the crystalline solid. As shown in FIG. 8, OH2 and OH3 crystals have an isomorphic structure. While in OH1 crystals the main charge transfer axis of the chromophores is oriented at $\theta_p=28°$ with respect to the polar axis, in OH2 and OH3 crystals the chromophores are almost parallel with $\theta_p=13°$, which is an optimal chromophore alignment for electro-optics with an order parameter close to 1 ($\cos^3 \theta_p=0.92$).

Due to highest powder SHG activities of the OH2 crystals these crystals investigated in more detail. Large size single crystals of OH2 were grown from methanol and acetonitrile solution by the slow evaporation method in an oven at 45° C. Orange-red crystals in the shape of plate, typically 3×2×0.5 mm in size were obtained in one week. OH2 crystals exhibit

TABLE 4

Physical and structural data of the investigated non-ionic CLP derivatives.

| | $\lambda_{max}$ (nm) | $T_m/T_i$ (° C.) | $\beta_{max}$ ($10^{-30}$ esu) | powder SHG | $\beta_{ijk}^{eff}$ ($10^{-30}$ esu) | $r_{ijk}$ @ 1.3 μm (pm/V) | crystal system space group (point group) |
|---|---|---|---|---|---|---|---|
| OH1 | 425 | 212/325 | 92.6 | 1 | $\beta_{333}^{eff}=$ 63.2 | $r_{333}=52$ | orthorhombic Pna2$_1$ (mm2) |
| OH2 | 424 | 242/326 | 89.6 | 2 | $\beta_{111}^{eff}=$ 82.2 | — | monoclinic Cc (m) |
| OH3 | 424 | 283/310 | 86.2 | 1 | $\beta_{111}^{eff}=$ 79.2 | — | monoclinic Cc (m) |
| DAST | 475 | 250/250 | — | 2 | — | $r_{111}=53$ | monoclinic Cc (m) |

Powder SHG efficiency was measured at a fundamental wavelength of 1.9 μm relative to that of OH1 powder. $\lambda_{max}$: the wavelength of the maximum absorption in methanol solution, $T_i$: the thermal weight-loss temperature, $T_m$: the melting temperature, $\beta_{max}$: the maximal first-order hyperpolarizability, $\beta_{ijk}^{eff}$: the components of the effective non-resonant hyperpolarizability tensor in the crystallographic system.

As listed in Table 4, the investigated phenolic CLP chromophores containing different number of methyl substituents on the non-π-conjugated part of the cyclohexene ring exhibit similar wavelength of the maximum absorption $\lambda_{max}$, thermal weight-loss temperature $T_i$ and microscopic molecular nonlinearity (maximal first-order hyperpolarizability $\beta_{max}$). This is because the microscopic molecular nonlinearity and the thermal stability are related to the length of the π-conjugated bridge and the existence of the cyclohexene ring preventing cis-trans isomerization, respectively. Therefore, the structural modifications on the non-π-conjugated part of cyclohexene ring do not affect the microscopic molecular nonlinearity and thermal stability, but only lead to different crystalline packing and macroscopic nonlinearity.

a large transparency range from 600 to 1650 nm. While OH1 crystals exhibit an absorption band at about 1.5 μm, OH2 crystals exhibit very low absorption in the optical telecommunication wavelength range (1.3-1.6 μm). The larger transparency range in the visible and the low absorption in the 1.3-1.6 μm range of OH2 crystals are of advantage for optical telecommunications and near-IR wavelength range photonic applications.

Although similar molecular arrangement and supramolecular interactions of phenolic CLP derivatives in crystalline state, OH2 crystals exhibit powder SHG efficiency of twice as large as OH1.

The maximum diagonal coefficient $\beta_{iii}^{eff}$, can be estimated as $\beta_{max}\cos^3\theta_p$. Although similar molecular nonlinearity $\beta_{max}$ of OH1 and OH2 chromophores, the order parameter $\cos^3 \theta_p = 0.92$ of OH2 is considerably higher. Thus, as $\beta_{ijk}^{eff} \propto \chi_{ijk}^{(2)}$ listed in Table 4, the maximal component of the effective hyperpolarizability tensor is larger in OH2 crystals compared to OH1 crystals.

6 Large-area Single-crystalline Thin Film Preparation

We developed a method to grow large-area high optical quality single crystalline thin films of OH1 with thicknesses from 0.05 to 20 μm directly on different substrates. The adhesion of the crystal to the substrate is very strong, which allows for using mechanical polishing of the top surface without removing the film and also lithographic processes to fabricate different microstructures.

6.1 Preparation of Surface-modified Substrates

The amorphous glass slides were sonicated in a water/methanol mixture solution. For enhancing the hydrophilicity and introducing the OH group on the surfaces, they were immersed in a "piranha" solution ($H_2SO_4/H_2O_2$ 70:30 v/v) for 30 min. The substrates were rinsed repeatedly with deionized water and washed with methanol. The substrates were dried with argon gas. This procedure resulted in OH-modified substrates. To introduce the CN and $CH_3$ groups on the surfaces by silanization, 3 mM of 4-trichlorosilyl butyronitrile and octadecyltrichlorosilane in chloroform were prepared. Then, the OH-modified substrates were immersed for 3 h. They were washed and sonicated in chloroform.

6.2 Single Crystalline Thin Film Growth

Figure 9:
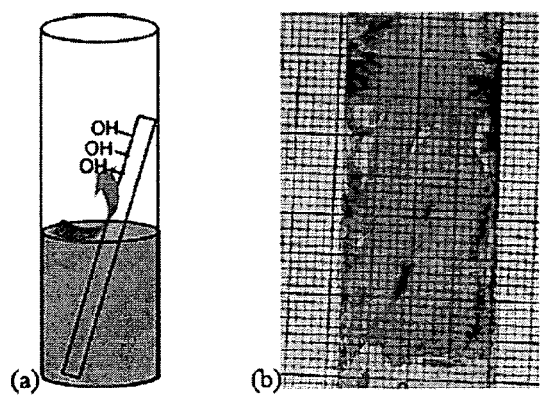
FIG. 9: (a) Schematic illustration of the thin-film crystal growth of OH1. (b) A photograph of a grown OH1 crystal on an amorphous glass substrate. The largest single crystalline area is 5 mm wide and 3 cm long.

OH1 solution with a concentration of 0.1 g OH1 in 100 ml methanol was prepared in a small glass bottle. The substrates were leaning in the solution against the glass wall at an angle of about 25', as shown in FIG. 9a. The bottles with OH1 solution and a slide glass were kept in an oven at 38° C. and were not completely closed, leading to the evaporation of the solvent at a rate of about 4 ml/day. As the solvent was evaporating, the OH1 crystal was growing along the surface of substrates (FIG. 9a).

OH1 crystals grew nicely on the upper part of the glass substrate. The grown thin-film crystals show large single crystalline domains of above 150 mm$^2$ with high optical quality (FIG. 9b). The thicknesses ranged from 5 to 20 μm.

The experiments show that thinner crystals down to 50 nm thickness can be grown using different solution concentration, growth conditions and substrates.

Substrates with pre-fabricated electrodes were also used for thin film growth. The normal slide glasses were patterned with gold electrodes and subsequently cleaned by piranha solution. The growth procedures were as above. Thin OH1 single crystalline films grew on gold-patterned substrate (FIG. 28d).

The crystals grow with their polar axis parallel to the substrate. In order to planarize the upper surface of the thin film, the grown thin film crystals were manually polished to λ/4 surface quality. This step resulted in a homogenous, planparallel, and high optical quality thin film with a thickness of 3-4 μm that were further used for waveguide fabrication.

The OH1 solutions in methanol were prepared with different concentrations and filtered through filter paper. The substrates having modified surfaces were immersed at an angle of about 30° from the vertical direction in the OH1 methanol solutions in a cylindrical container of 4 cm diameter. The containers were placed in an oven of constant temperature (40° C.). The methanol solvent evaporated slowly at a rate of about 2 mL/day and OH1 crystals nucleated and grew on the modified substrates. The thickness of the films was determined by a Tencor Alphastep P11 profilometer.

6.3 Discussion

To induce strong specific interactions between the OH1 molecules and the surface and to control the liquid-solid surface tension between the substrate and solution, we prepared hydrophilic glass substrates functionalized with —OH and —CN groups by piranha solution treatment and silanization with 4-trichlorosilyl butyronitrile, respectively. Since the OH and CN groups are the hydrogen bonding donor and acceptor sites in OH1 crystals, the OH— and CN-modified surfaces can act as a mimic crystal surface and can interact with OH1 molecules. For comparison, hydrophobic $CH_3$-modified glass substrates were also prepared by silanization with octadecyltrichlorosilane.

Single crystalline thin films of OH1 were grown from methanol solution on the modified substrates. Different from the growth techniques using a capillary effect occurring between two glass substrates only one substrate was used. This substrate was immersed at an angle of about 30° from the vertical direction in the 0111 methanol solution in an oven at constant temperature (40° C.). The solutions had a very low concentration, typically 1 order of magnitude lower (0.1-0.6 g of OH1/100 g of methanol) than the saturated concentration (3.74 g of OH1/100 g of methanol at 40° C.) to prevent spurious nucleation in the solution. As the methanol solvent evaporated slowly at a rate of about 2 mL/day, OH1 crystals first nucleated and then continued to grow on the modified substrates. The resulting OH1 crystals grown directly on amorphous modified substrates are shown in FIG. 28. The OH1 crystals grew very well and fully covered the OH- and CN-functionalized substrates (see FIG. 28a,b). On the other hand, on the hydrophobic $CH_3$-functionalized substrates OH1 crystals did not grow, forming only small amorphous droplets (see FIG. 28c).

The reasons for a much better crystal growth in the OH- and CN-modified substrates compared to $CH_3$-substrates may be related to ELSSI. As shown in FIG. 27, due to the very low surface tension, the hydrophilic OH1 solution has almost a zero contact angle and forms a thin wetting layer on hydrophilic substrates during the evaporation. Although in this work the concentration of the OH1 solution is well below the saturation on the hydrophilic CN- and OH-modified substrates, nucleation can appear near the interface between air and solution on the substrate (i.e., on top of the wetting layer). The reason for the nucleation is an enhanced evaporation in this wetting layer compared to the rest of the solution and the concentration in this region may become locally supersaturated. Moreover, in this local supersaturated region, OH1 molecules having strong hydrogen bond donor OH sites and acceptor CN sites strongly interact with hydrogen bond donor OH groups or acceptor CN groups on the modified surface of the substrates. Therefore, by evaporation-induced local supersaturation in the wetting layer on strongly hydrophilic substrates and strong specific interactions between OH1 molecules and modified substrates, the first few thin nuclei are formed at the top of the wetting layer. After forming the first nuclei, OH1 molecules continue to crystallize following the evaporation direction on the substrate. The molecules are continuously supplied by the concentration difference between the wetting layer and bulk solution (see FIG. 27a). Since the growth is seeded by the first nuclei, the concentration of the solution in the wetting layer remains within the solution metastable zone, and therefore further spontaneous nucleation does not occur anymore on the substrate as well as within the solution. Our investigations show that the metastable zone of the OH1/methanol system is relatively large, and therefore this condition is easy to achieve. This allows for growing crystals with very large-area single domains having essentially unlimited domain length.

On the $CH_3$-functionalized surface, the OH1 solution has a larger contact angle, and the liquid-solid surface tension is higher than on CN- and OH-modified surfaces (see FIG. 27b). As the air-solution interface moves down by solvent evaporation, the meniscus area is stretched and the meniscus is unstable. As a consequence, the meniscus is either split into a droplet and a new meniscus, or the contact line of the meniscus just slips down. In addition, the $CH_3$-functionalized surface cannot interact with OH1 molecules. Therefore, as shown in FIG. 28c, OH1 crystals did not grow on the $CH_3$-functionalized substrates.

We have investigated single crystalline domains of crystals grown on CN- and OH-modified substrates under crossed polarizers (see FIG. 28). As we rotate the sample between the crossed polarizers, single crystalline domains with good optical quality appear, having the same change of transmittance. The fully covered substrates consist of only a few long and large-area single crystalline domains. The single crystalline domains reach lengths of over 4 cm and thicknesses in the range of 0.1-4 μm with good optical quality, suitable for the fabrication of photonic devices. Both OH- and CN-modified surfaces promote high quality single-crystalline thin-film growth of OH1, based on the surface hydrophilicity and surface specific interactions. OH-modified surfaces can be easily prepared by piranha solution, while CN-modified surfaces need the piranha treatment and also silanization that is sensitive to humidity and the content of impurities. Therefore, using OH-modified substrates for large-area single-crystalline thin films of OH1 results in a facile process without any additional complicated procedure.

To understand the morphology of the grown thin films, X-ray diffraction patterns were recorded in the reflection mode. As shown in FIG. 29a, very sharp peaks were observed, indicating a high crystalline quality. The Bragg peaks could be assigned to (200), (400), (600), (800), and (1000) crystallographic planes. Therefore, the large crystal surface corresponds to the bc crystallographic plane, and due to the orthorhombic crystal system of the crystals, the a-axis is perpendicular to the surface of the thin films. We can conclude that the OH1 crystals on the substrates grow normal to the crystallographic a-axis direction and form specific interactions with hydrogen bonds as illustrated in FIG. 29b. We determined the directions of the b- and polar c-axes by measuring the change of the transmittance under crossed polarizers. They can be easily identified according to the high anisotropy of the optical indicatrix: the optical principal axis with a lower transmission for light polarized along it is the polar c-axis. Inspecting the grown films has shown that the polar c-axis is oriented along the evaporation direction (growth direction) of the solvent with a small variation for different single-crystalline domains (up to 20 degree). This can be related to the fact that the growth rate of OH1 is the fastest along the polar axis direction. Therefore domains with the polar axis matching the growth direction will predominate.

FIG. 30 shows a transmittance spectrum of the single crystalline domain on the OH-modified substrate for light polarized along the c-axis, using a pinhole of about 1 mm diameter. The spectrum shows interference fringes due to the multiple reflections of light at the film/air and film/substrate interfaces. This confirms that the films are of high optical quality without noticeable scattering centers.

The thickness of the films can be controlled by the concentration of the solution. We prepared crystalline films using various initial concentrations in the range of 0.1-0.6 g of OH1/100 mL of methanol. All measurements were performed at the same temperature (40° C.) and for the same tilt angle of the substrate (30° from the vertical), in order to exclude their influence on the film thickness. The thickness of these films was measured at the nucleation point and at 3 cm below the first nucleation point, since the concentration of the solution increased by solvent evaporation during the growth. FIG. 31 shows the measured film thickness as a function of the concentration of the initial solution. We observed that the thickness of the films is generally larger for higher concentrations of the initial solution. The thickness variation becomes smaller with an increase in the initial solution concentration, which indicates that one can most likely avoid the thickness variation by properly adjusting the growth conditions (concentration, temperature, tilt angle) to achieve the mass balance, that is, to match the growth and the solvent evaporation rate to the amount of the material in the solution. Nevertheless, this small thickness variation is not relevant for integrated electro-optic modulators in our case, since for the optimized electrode configurations waveguides are aligned perpendicularly to the polar c-axis, where there are no thickness variations. Using the thin films grown as presented above, we have successfully fabricated single crystalline waveguides and already demonstrated efficient electro-optic modulation.

The ELSSI method may be applicable to other organic crystals, as long as they can nucleate and grow well from the solution, as well as have a large enough metastable zone to avoid spontaneous nucleation during growth. Obviously the growth parameters and substrate surface properties need to be adjusted for a different material/solution system.

In order to check the possibilities to expand our ELSSI method, we grew the OH1 single crystalline films directly on other substrates, glass substrates with a gold-electrode pattern and patterned silicon on insulator (SOI) substrates. Usually organic materials are difficult to pattern by conventional wet lithography due to the incompatibility of the solvents; therefore, a rather complex fabrication procedure has to be developed. To simplify the fabrication procedures, we directly grew the OH1 thin films by the ELSSI method on the electrode-patterned substrates, which do not need additional lithography for patterning the electrodes (see FIG. 28d). SOI substrates with patterned silicon wires and treated by a piranha solution were also prepared and single crystalline thin films could be successfully grown on top by an ELSSI method. Therefore, ELSSI is very promising new method for the fabrication of single crystalline thin films for very large-scale integrated (VLSI) photonic devices.

In summary, we developed a new approach for the growth of large-area organic electro-optic single crystalline thin films on various amorphous substrates by evaporation-induced local supersaturation method with surface interactions (ELSSI). We obtained high optical quality thin films of OH1 chromophore on amorphous hydrophilic CN- and OH-modified substrates. The OH1 films were grown with a very large single crystalline domain size of over 2 $cm^2$ in area, thicknesses in the range of 0.1-4 μm and are well suited for the realization of integrated electro-optic structures. The adhesion of the crystal to the substrate is very strong, which allows for the fabrication of even thinner crystal layers using mechanical polishing. With these single crystalline films grown using ELSSI we avoid the problems of electrical poling and long-term orientational stability as observed in most of the electro-optic polymers developed up to now. Also the photochemical stability in single crystalline (waveguide) materials has been shown to be in general superior to their polymeric counterparts. Therefore, ELSSI is a very attractive technique for low-cost and large-scale fabrication of highly integrated photonic devices.

7 Waveguide Fabrication

7.1 Waveguide Patterning by Optical Lithography

Figure 10:
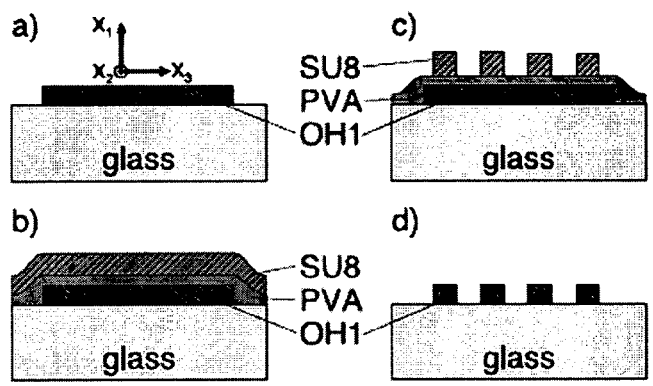
FIG. 10: a) 3-4 μm thick crystalline thin film on glass after solution growth and upper-surface polishing. b) Deposition of PVA protection layer (480 nm) and SU8 photoresist (4.8

We have patterned straight waveguides of various geometries using optical lithography. The process steps are schematically depicted in FIG. 10 a)-d). Since OH1 is soluble in most organic solvents used in conventional lithography processes, a protection layer on top of the crystal is necessary. A clear and viscous solution (10% w/v) of polyvinyl alcohol (PVA) (87-89% hydrolyzed with molecular weight Mw=31000-50000) was prepared using distilled water as solvent that does not dissolve OH1. The solution was spin-coated at 2000 rpm forming a 500 nm thick protection layer that is resistant to most organic solvents. Although bulk OH1 crystals remain in a stable crystalline form up to the melting temperature at 212° C., we have observed that micrometer size thin films on glass tend to transform into an amorphous state induced by eventual scratches from non-perfect polishing at temperatures above 90° C. In order to avoid this a non-standard lithography process with SU8 as photoresist was used [29]. SU8 2005 was spincoated at 3000 rpm forming a 4.8 μm thick resist layer. The softbake and post-exposure bake temperatures were kept below 65° C. FIG. 11a) shows the patterned resist on top of the PVA-protected thin film crystal. The waveguides are aligned parallel to the $x_2$-axis of the crystal. This allows to take full advantage of the electro-optic effect with the largest coefficient $r_{333}$ of OH1 for propagating TE-modes for which the modal electric field oscillates in the direction of the polar $x_3$-axis of the crystal in the thin film plane.

7.2 Pattern Transfer by Reactive-ion Etching

The waveguide pattern was then transferred into the crystal by reactive-ion etching (RIE). Organic materials can be etched with high etch rates using oxygen as reactive agent. Since both, resist and crystal are organic compounds it is important to optimize the etch process for OH1, thereby obtaining the best selectivity against SU8. The etch rate of OH1 could be substantially increased by adding $CF_4$ to the oxygen as etch gas. FIG. 12 shows the etch rate of OH1 as a function of the $CF_4$ concentration. The total gas flow was 52 sccm for all combinations of gases, while the chamber pressure was kept at 200 μbar for the experimental determination of the etch rates. The forward rf-power was set to 200 W. The etch rate exhibits a sharp maximum at a gas flow ratio of $CF_4:O_2 \approx 23\%$. At this point an etch rate selectivity of OH1 against SU8 of approximately 1:1.35 was obtained. For the pattern transfer of the waveguides into the OH1 crystalline thin film we used a lower chamber pressure of 25 μbar with the same ratio of etch gases. This led to a lower etch rate with the same selectivity between crystal and resist and an improved surface quality of OH1. The etch time was adjusted in order to fully etch away the remaining resist and PVA protection layer on the waveguides. FIG. 11 shows a microscope image of a fabricated single crystalline waveguide array after the etch process. We successfully structured waveguides with lateral dimensions of w=7.6, 5.4 and 3.4 μm and a height h=3.5 μm that were 0.8 to 2 mm long.

7.3 Waveguide Characterization

In order to couple light into the waveguides we cleaved the glass substrates after defining the cleavage plane with a diamond scribe on the back of the substrates. This produced well defined cross-sectional facets of the waveguides. Light was coupled into the waveguides by the conventional end-fire coupling technique. For the smallest measured waveguides with dimensions of w×h=3.4×3.5 μm² the profiles suggest that only the first order mode can propagate with small guiding losses. Even though simulations show that all three waveguide geometries (w=7.6, 5.4 and 3.4 μm) are not single mode, higher order modes are less strongly confined in the waveguide and therefore, experience higher scattering losses at the sidewalls of the waveguide. The reason for this is a very high index contrast of the produced structures $\Delta n = n_3 - n_{glass} = 1.16$ and 0.72 at the wavelengths 632.8 nm and 980 nm, respectively. Such high index contrast is very interesting for very large scale integrated (VLSI) photonics, e.g. microring-resonator and photonic crystal devices.

The propagation losses were determined at $\lambda$=632.8 nm and 980 nm for both, TE- and TM-polarized modes. At $\lambda$=632.8 nm the intrinsic absorption losses in the material are substantial and therefore constitute a dominant contribution to the measured losses. The absorption coefficient, as measured in OH1 bulk crystals leads to a loss of 46 dB/cm for TE modes and 13 dB/cm for TM modes, assuming $\alpha_1 \approx \alpha_2$. In the range from 800 nm up to 1400 nm light is only very weakly absorbed by OH1 enabling the fabrication of potentially efficient waveguides with losses below 1 dB/cm.

For the determination of the propagation losses, an image of the scattered light was taken from the top of the waveguide using a high resolution infrared sensitive CCD camera. Assuring the linearity of the detection system, the scattered light is proportional to the guided light intensity I(z) at all positions z along the waveguide, and the propagation loss α can be calculated by analyzing the variation of the scattered light intensity. In Table 5 the smallest measured propagation losses of the fabricated waveguides for different polarizations and geometries w×h are given. At $\lambda$=980 nm, propagation losses for TE and TM modes are approximately the same, where as at $\lambda$=632.8 nm the losses depend strongly on the polarization due to the large difference of the absorption coefficients. For multimode waveguides at $\lambda$=980 nm we have obtained losses well below 10 dB/cm, which proves that the fabrication method developed is promising for future applications.

TABLE 5

Propagation losses α for different waveguide geometries w × h and polarizations.

| w × h | $\lambda$ = 632.8 nm | | $\lambda$ = 980 nm |
|---|---|---|---|
| [μm²] | TE | TM | TE (≈TM) |
| 7.6 × 3.5 | 49 ± 5 dB/cm | 16 ± 2 dB/cm | 2.1 ± 0.9 dB/cm |
| 5.4 × 3.5 | 51 ± 3 dB/cm | 20 ± 2 dB/cm | 9 ± 1 dB/cm |
| 3.4 × 3.5 | 56 ± 3 dB/cm | 25 ± 3 dB/cm | 17 ± 2 dB/cm |

At $\lambda$ = 632.8 nm the material absorption alone leads to a loss of 46 dB/cm and 13 dB/cm for TE- and TM-modes, respectively.

7.4 Electro-optic Phase Modulation

For phase-modulation measurements we have used a 1.0 mm long, straight-waveguide sample with cross-sectional dimensions of w×h=3.4×3.5 μm². Gold electrodes have been deposited by vapor deposition using a simple shadow mask. The electrode separation d was 50 μm. The sample was placed in one arm of a Mach-Zehnder interferometer. TE-polarized light was coupled into the waveguide with the end-fire coupling technique using a 100× microscope objective. A sinusoidal modulation voltage with an amplitude of 10 V and a frequency of 1 kHz was applied at the electrodes across the waveguide in the direction of the polar axis of the crystal. The applied electric field causes a deviation of the refractive index of the guiding material and introduces a phase shift of the light passing the waveguide A typical modulation signal as seen on the oscilloscope is shown in FIG. 13

The electric field inside the waveguide with the given electrode configuration was calculated with the simulation package Femlab from COMSOL. The electric field in the guiding material is smaller than in the air due to the difference in the dielectric constant $\in_r$. For the simulation we used $\in_{r,x_3}=5.26$ as the dielectric constant along the polar axis of OH1, which is an extrapolated value from THz-frequency range measurements. For the electric field inside the guiding region we obtained $\delta E=0.049\pm0.009$ V/μm at an applied voltage of $\delta U=10$ V across the electrodes. The results of the electro-optic coefficient measurement and the calculated average electric field in the waveguide are given in Table 6. We have obtained a little more than 70% of the bulk values we measured. This is possibly due to the fact that the measured waveguides were not strictly single-mode and higher order modes with lower effective indices were decreasing the measured effect. The determination of the electro-optic coefficient has been repeated with different size waveguide samples, yielding very similar results. The half-wave voltage $V_\pi \times L$ resulting from the current configuration is 8.4 Vcm and 28 Vcm at 632.8 nm and 852 nm, respectively.

TABLE 6

Measured electro-optic coefficients $r_{wg}$ in single crystalline waveguides of OH1 at the wavelengths $\lambda$ = 632.8 and 852 nm.

| $\lambda$ [nm] | $r_{bulk}$ [pm/V] | $r_{wg}$ [pm/V] | $r_{wg}/r_{bulk}$ [%] | $V_\pi \cdot L$ [Vcm] |
|---|---|---|---|---|
| 632.8 | 109 ± 4 | 80 ± 2 | 73% | 8.4 ± 0.3 |
| 852 | ≈71 | 51 ± 4 | 72% | 28 ± 3 |

The ratio to the bulk value $r_{bulk} = r_{333}$ as well as the resulting half-wave voltage × interaction length product $V_\pi \times L$ are given.

The geometry of the electrodes has not been optimized and can be considerably improved by reducing the electrode spacing d. A cladding with a similar dielectric constant as OH1 will further reduce the half-wave voltage of the device. A PVA thin film presents a possible solution since it features a dielectric constant $\in_{r,PVA}=5.08$ at 1 MHz [30] and it is water-soluble and therefore processable in combination with OH1. Calculations using Femlab have shown that a more densely packed electrode configuration with a spacing of 1 μm between waveguide and electrode on both sides increases the average electric field in the guiding material from $E=0.049\pm0.009$ V/μm (our configuration) to $E=1.05\pm0.14$ V/μm at the same applied voltage of $\delta U=10$ V. The proposed geometry leads to an increase of the electro-optic efficiency by a factor of more than 20. Consequently, a reduction of the half-wave voltage×length product $V_\pi \times L$ to 0.39 Vcm and 1.3 Vcm at the wavelengths of 632.8 nm and 852 nm may be achieved, respectively, based on the r-coefficient we have determined experimentally. With such waveguides it is therefore possible to combine low driving power with extremely fast response of organic materials, which should enable switching and modulation at a high rate of up to 200 GHz and above.

8 Melt Growth of Single Crystalline Waveguides and Nanowires 8.1 Growth of Single Crystalline Microstructures from Melt In this section the technique of fabricating crystalline waveguides of CLP crystals is described. The first step is to pattern the waveguide geometry in a substrate material and to equip it with electrodes. In a second step, a cover is anodically bonded to the substrate to delimit the volume for the crystallization of the EO active material. Finally, material powder is placed on the substrate at the edge of the cover and melted such that the melt can flow through the waveguide channels into the structure and crystallize there.

To manufacture the structured and electrode equipped substrate two photolithographic steps were required. In a first step 40 nm chromium and 50 nm amorphous silicon were deposited on a borosilicate glass wafer by standard photolithographic processing, and a standard lift-off technique (see FIG. 14a). The chromium was used as electrical contacts to the waveguide in the final structure and silicon was required for anodic bonding. In the second lithographic step grooves with typical dimensions of 1.5-5 μm width were structured in-between the electrodes into the commercial photoresist AZ6632 and then transferred to the borosilicate substrate wafer by subsequent reactive ion etching (see FIG. 14b).

A cover borosilicate glass shorter than the length of the structured grooves was anodically bonded to the structured substrate wafer, such that the left and right ends of the grooves in the substrate protruded from the edges of the cover glass and the material melt could flow in (see FIG. 14c). Anodic bonding is one of a number of techniques used in the semiconductor industry for wafer bonding [31, 32, 33]. It is well-established and was in 2004 reported to account for the majority of all packaging applications for microelectromechanical (MEMS) devices [33]. The substrate and cover material is a commercial standard borosilicate glass suitable for anodic bonding to silicon due to a thermal expansion coefficient that matches the one of silicon in order to avoid thermal stress. The borosilicate wafers had a thickness of 200±25 μm, an averaged roughness of the surface of less than 1.5 nm and a total thickness variation of less than 10 μm. The anode of a high voltage power supply was contacted to the deposited chromium and the cathode to a wolfram plate pressed slightly against the cover glass. The bonding process was performed at a temperature of 456° C. by applying a dc voltage of 700 V to the two electrodes. The silicon deposited on top of chromium acts as a sodium diffusion barrier. It has been shown that in similar geometries also very thin layers of 20 nm silicon are sufficient as sodium diffusion barriers [34].

Finally a few milligrams of material powder were placed onto the substrate immediately at the edge of the cover glass, where the structured grooves in the substrate glass were still present and accessible for the melt. To one side of the sample a 100 mm long and 20 mm wide aluminium foil was attached by silver paint. The sample was put into a glass tube, which was filled with argon at atmospheric pressure and sealed with a vacuum valve. The sample was then placed in the middle of a heating coil and heated until the material started to melt and to flow into the channels (see FIG. 14d). Instead of moving the sample into a cooling section as it is usually the case for Bridgman methods, we have chosen cooling ramps on the order of 30° C. per hour. The aluminium stripe attached to one side of the sample should ensure an asymmetry in the temperature profile along the channels to prevent several nucleation points. The total growth time is with less than eight hours relatively short, which is another advantage compared to e.g. solution grown thin films that typically require 2-10 weeks growth time [15].

The quality of the melt grown crystals was investigated by optical and electron microscopy. The crystalline wires exhibit a very good optical quality. FIG. 15 shows a scanning electron microscopy (SEM) image of a cleaved straight waveguide structure with a thickness of h=0.97±0.12 μm. After cleaving the sample perpendicular to the waveguides, the end-facets of the melt grown crystals appear sharp and flat, as determined by the scanning electron microscopy (SEM). Additional polishing was therefore not required and waveguiding was clearly observed by using conventional end-fire coupling at the telecommunication wavelength of 1.55 μm.

8.2 Growth of Single Crystalline Nanowires and Nanosheets (Sub 30 nm Thick Crystals)

It was recently reported that slotted silicon waveguide configurations allow for a considerable improvement of the tunability of EO modulators, sensors and all-optical switching devices over the current state of the art [35, 36]. The essential feature of a slot waveguide is that two high-index silicon stripes are separated by a small distance on the order of 20-140 nm filled with a lower-index material. The optical field intensity in such a structure tends to concentrate within the low-index slot for the polarization perpendicular to the slot. Therefore and also due to the close proximity of the electrical contacts in a slotted geometry filled with a EO active material, a very large refractive index change for a given modulation voltage can be obtained compared to a more conventional waveguide with external electrodes. It was shown that even at very small gaps, on the order of 20-40 nm, the modulation bandwidth per Volt still increases for narrower and narrower gaps [36]. The method presented here, offers the possibility of the growth of single crystalline nanowires inside nano-sloted structures with slot dimension of at least down to 25 nm.

The nanometer size channels were realized with a simple one-layer approach and a standard lift-off process. The commercial photoresist ma-N 415 was spin coated on the borosilicate substrate. A standard UV lithography process was performed to generate the required ridges in the photoresist with widths between 3 and 11 μm. Approximately 20 nm silicon was then deposited preserving the undercut for subsequent lift-off. Finally, to obtain the 25 nm high and several μm wide channels, the fabricated pattern in silicon was terminated by anodic bonding of a second borosilicate wafer to the structure and the crystals grown in these structures as described in the previous section. A microscope image and a scanning electron micrograph of the grown crystals are shown in FIGS. 16 and 17 respectively. A crystal thickness of approximately 25 nm perpendicular to the c-face corresponds, according to the unit cell parameters, to only approximately a dozen unit cells in this direction.

Furthermore, the lateral crystalline dimension of the reported nanowires could be increased by two orders of magnitude and therefore the growth of ultra-thin large-area crystals was possible as well. The processing to achieve these nanosheets was analogous to the one depicted in FIG. 14, except that the chromium-silicon bonding areas were structured much further apart, such that channel dimensions of about 90 nm height and 0.5 mm width were formed. Inspection of the grown nanosheets under the microscope between crossed polarizers showed that the crystal orientation is usually preserved for domain sizes on the order of 10,000 μm$^2$. In these preliminary experiments small gaps within the nanosheets appeared (black spots in FIG. 18), where crystalline material is absent.

The nanosheets produced in this way are highly interesting also because with their help the crystals can be grown in closed waveguide configurations, such as microrings (see FIG. 18) and photonic crystal structures. Waveguide structures of any shape can be fabricated by RIE in the substrate borosilicate wafer (analogously to the straight waveguide structuring in FIG. 14) and they can be filled by flowing the melt through the nanosize channels to the fabricated structure. The orientation of the crystal in the waveguide-structure is determined by the corresponding single crystalline domain of the nanosheet.

9. Organic Electro-optic Mach-Zehnder Modulators Based on Silicon-on-insulator Wire Waveguides An alternative electro-optic modulation scheme is proposed and demonstrated for amplitude modulators based on silicon-on-insulator (SOI) Mach-Zehnder interferometer (MZI) structures and organic electro-optic crystals. We have fabricated silicon-on-insulator MZI-structures with lateral electrodes using conventional optical lithography. For electro-optic modulation, single crystalline OH1 thin films have been grown on top of the structures as active cladding material. It is shown that both, the TM and TE fundamental modes in the silicon wires guide considerable intensity in the cladding material, allowing high efficiency cladding modulation. The demonstration of electro-optical amplitude modulation in such structures proves, for the first time to our knowledge, the compatibility of crystalline materials with the silicon-photonics technology. The experimental determined half-wave voltage $V_\pi \cdot L$ is 45±10 Vcm, in agreement with theory. An optimized electrode-waveguide system can further reduce $V_\pi \cdot L$ to 2.0 Vcm for TM-modes and even 0.17 Vcm for TE-modes. The proposed cladding modulation significantly reduces fabrication complexity of crystalline electro-optic waveguides, compared to previously developed techniques. The attachment of the active cladding material is generally applicable to a wide range of crystalline materials. In contrast to polymer claddings proposed previously, crystalline electro-optic materials feature an excellent long term stability of the chromophore orientation, superior photochemical stability, and do not require high-field poling prior to operation.

9.1 Introduction

Silicon-on-insulator nanowire waveguides are very attractive for very large scale photonic integrated circuits (PICs) [37, 38]. Due to the high index contrast between Si and SiO$_2$, compact splitters, couplers and micron-sized bend radii can be realized. Various passive linear functions such as wavelength division multiplexing (WDM) filters based on arrayed waveguide gratings (AWGs) [39] as well as microring resonators (MRRs) [40] have been demonstrated. Another advantage of this technology is its close relation to complementary metal-oxide semiconductor (CMOS) technology, which allows the application of its matured processes and the access of its huge knowledge base. Integrated optics in silicon is also interesting for cost reasons. Silicon-on-insulator wafers are considerably more attractive in price compared to more exotic materials such as the III-V semiconductor compounds or the insulator LiNbO$_3$. Phase modulators in SOI rib waveguides have been fabricated for many years [41]. However, these modulators are based on current injection, which keeps the bandwidth within the GHz region. This limitation does not meet todays requirements for high-speed optical communication. Nano-slot waveguides have been proposed in combination with an electro-optic polymer cladding in order to reduce modulation voltages by orders of magnitude [42]. However, technological difficulties and stability issues with the polymers involved have led to moderate success up to date. We propose and demonstrate an alternative scheme for cladding modulation based on SOI wire waveguides in combination with an organic small-molecule single crystalline material used for electro-optic tuning of the guided modes. OH1 was used as the electro-optic material of choice because of its favorable growth characteristics and high electro-optic coefficients. Organic crystalline materials exhibit the advantage of stable chromophore orientation, high electro-optic coefficients, as well as the promise for high bandwidth operation in the 100 GHz regime and above [26].

9.2 Design of Active Waveguides

There are three basic possibilities of tuning the effective index of guided modes by means of the electro-optic effect, shown in FIG. 19. Type a) is the conventional one, in which the waveguide core material is electro-optically active. This modulation scheme is used most often, for example in commercial LiNbO$_3$ high-speed modulators. The other two types b) and c) can be directly combined with the highly advanced SOI technology. Cladding modulation is the scheme used for type b), where an electro-optic refractive index change in the cladding material results in a change of the effective index, corresponding to the guided mode in the SOI waveguide structure. Type c) is a non-conventional waveguide structure, in which the modal intensity is enhanced in the sub-100 nm wide slot consisting of the active material embedded in a silicon wire single-mode waveguide [43]. In both waveguide types b) and c), the silicon structures can be used as electrodes, provided they are adequately conductive. Especially for type c), this can lead to high electric fields for low applied switching voltages [42].

Phase modulation in electro-optic core materials of type a) could be demonstrated in OH1. The fabrication of the waveguide structures required a modified and rather complex photolighography procedure. FIGS. 20 a) and b) show the simulated intensity distribution for the type b) and c) waveguide structures with a typical refractive index of an organic electro-optic cladding material (n≈1.6). There exists a high refractive index contrast between the silicon core (n=3.48) and the cladding, allowing a high integration density of photonic devices. Despite the high index contrast, both waveguide structures guide a large part of the modal intensity in the cladding material. This phenomenon is due to the Maxwell Equations, which requires that the normal component of the electric field $E_\perp$ behaves as $$\varepsilon_{core} E_{\perp,core} = \varepsilon_{clad} E_{\perp,clad} \Rightarrow \frac{E_{\perp,clad}}{E_{\perp,core}} = \frac{n^2_{core}}{n^2_{clad}} > 1 \quad (3)$$

at the interface of two materials with different refractive index $n_{core}$ and $n_{clad}$. Relation (3) is apparent for the TM-mode in FIG. 20 a) and the TE-mode in b) with their dominant electric fields in y- and x-direction, respectively, for the layered structures involving SiO$_2$, Si, and the electro-optic material. The step in the electric field at the material interfaces is reflected in a corresponding step in light intensity of the guided modes.

The advantage of the slotted structure in FIG. 20b) is the strong modal confinement and high light intensity in the active material, which is especially interesting for higher order nonlinear optical effects that are intensity dependent. In the case of electro-optic modulation, the narrow slot, functioning as the gap between the two silicon ridge electrodes, results in high electric field strength for comparably small applied voltages. This leads to a high electro-optic refractive index change at small modulation voltages. The advantages of the slotted waveguide structure, however, come at the expense of the technological difficulties of patterning narrow slots into the silicon below the resolution capabilities of standard optical lithography processes, and filling the slots homogeneously with an appropriately ordered electro-optic material.

9.2.1 Cladding Modulation with OH1

Due to the favorable growth properties of OH1, it was chosen as the active cladding material for Mach-Zehnder (MZ) modulators of type b) in FIG. 19. The crystalline thin films grow with their $x_1$-axis perpendicular to the substrate surface. The direction of the polar axis can be controlled by the growth process described above. The ideal alignment is the one with the polar $x_3$-axis perpendicular to the electrodes on both sides of the waveguides, which results in the deployment of the electro-optic coefficient $r_{113}$ and $r_{333}$ for TM- and TE-modes, respectively. The relevant material parameters are summarized in Table 7, valid at the wavelength $\lambda_0=1550$ nm. Standard SOI integrated waveguide technology consists of rectangular silicon nanowires with a height h=220 nm and a width w<430 nm for single mode operation in combination with cladding materials different from air [38]. The sensitivity factor $\xi_{n_i} = \partial n_{eff}/\partial n_i|_{n_i}$ is an important term in the context of electro-optic cladding modulation, since it determines the efficiency of the change in effective index $\Delta n_{eff}$ of a guided mode as a result of the refractive index change of the cladding material $\Delta n_i$. This efficiency has been simulated using the Olympios mode solver package Selene for different waveguide geometries and different cladding indices $n_i$ for the fundamental TM-, and TE-modes. FIG. 21a) shows the modulation efficiency $\xi_{n_i}$ as a function of the cladding index $n_i$ for three different waveguide widths w=400, 500, and 600 nm (h=200 nm). For TM-modes, the efficiency rises rapidly with increasing $n_i$, since the initially symmetrical mode distribution in vertical direction shifts its intensity maximum to the side of the active cladding (see FIG. 20a)). Due to the decreasing refractive index contrast, the slope of the curve levels off for a further increase of $n_i$, in accordance with Eq. 3. For TE-modes, where $E_{\parallel,core} = E_{\parallel,clad}$, $\xi_{n_i}$ increases with a decreasing modal confinement in the silicon core, which is the consequence of an increasing $n_i$. For the same reason, the modulation efficiency increases for a decreasing width w of the Si wire. The refractive indices $n_1$ and $n_3$ of OH1, valid for the TM-, and TE-modes, respectively, are indicated in the figure as vertical bars. The material is highly suitable for this application, however, higher refractive indices, would result in even larger efficiencies at the expense of a reduced index contrast. FIG. 21b) shows the modulation efficiency $\xi_{n_i}$ as a function of the silicon core height h, taking into account the material parameters of OH1. As expected from Eq. 3, the TM-mode is more advantageous than the TE-mode, reaching efficiencies as high as 80% for silicon heights below 180 nm. However, also TE-modes can achieve a $\xi_{n_i}$ up to 60% for wires with reduced heights and a width w=400 nm. These results show that the cladding modulation scheme is superior to electro-optically active waveguide cores of type a) in FIG. 19, due to a possible reduction of the gap G between the electrodes.

TABLE 7

Relevant material parameters, including refractive index $n_i$, electro-optic coefficient $r_{ii3}$, and electro-optic figure of merit $n_i^3 \cdot r_{ii3}$ for OH1 at $\lambda_0 = 1550$ nm.

| Mode | $n_i$ | $r_{ii3}$ [pm/V] | $n_i^3 \cdot r_{ii3}$ |
|---|---|---|---|
| TM | $n_1 = 1.62$ | $r_{113} = 6.7$ | 29 pm/V |
| TE | $n_3 = 2.13$ | $r_{333} = 46.7$ | 450 pm/V |

9.3 Device Fabrication

Silicon-on-insulator wafers from Soitec were used as starting material for the fabrication of integrated MZ-type modulators. The substrate featured a single-crystalline Silicon layer with a thickness of 200 nm. The thickness of the buried oxide was 2 µm. The process steps of the device fabrication are depicted in FIG. 22. a) Waveguides and MZ-structures were patterned using standard optical lithography processes using ma-N 1410 as a negative photoresist. The guiding structures were w=3-5 µm wide and several mm long. The patterns in the resist were transferred into the SOI-layer by reactive-ion etching (RIE) on a machine from Oxford Instruments (Plasmalab 80). Total etching time for an etch depth of 240 nm at 200 W forward power was 12 min. A combination of different etch gases was used including $O_2$, Ar, $CF_4$ and $CHF_3$. b) After removing the remaining resist and cleaning the substrate, the electrode structures were patterned with a distance a=2 μm from the waveguides, resulting in a gap G=2a+w. A mask aligner from Karl Süss (MA6) was used for the alignment and exposure of the positive photoresist (AZ 6632) with a sufficient thickness for metal lift-off. c) 200 nm $SiO_2$ followed by 50 nm of Cr were deposited onto the substrates. The oxide was necessary to reduce reflections and guiding losses in the regions where the electrodes cross the waveguides in order to contact the inside of the MZ-structures. Metal lift-off was performed in an ultrasonic bath in acetone, revealing the MZ-structures shown in FIG. 23. The interaction length within the MZ-interferometer was 0.5 mm long. d) Large-domain, single-crystalline OH1 was subsequently grown directly onto the prepared substrates with the dielectric $x_1$-axis of the crystal normal to the substrate surface. The growth details are described above, leading to 2-5 μm thick single-crystalline thin films with their polar $x_3$-axis directed perpendicular to the electrodes. After thin film growth, the device was covered with a 2 μm thick, spin coated polyvinyl alcohol (PVA) protection layer. The substrates were then cleaved using a diamond scribe, in order to produce a clean facet required for coupling light into the waveguides.

9.4 Device Characterization

Due to the resolution limitations of the lithographic process used for this demonstration experiment, the waveguides were wider than the ideal wire width of w≈400-500 nm with the consequence of allowing multiple modes to propagate. The cladding modulation efficiencies for these structures have been determined numerically. For wire widths w>1 μm, the efficiencies for the first guided mode remain constant, as shown in FIG. 24. The efficiency for TE fundamental modes is considerably smaller due to the strong confinement of the light intensity for this polarization.

The integrated MZ-interferometers were analyzed using a standard end-fire coupling setup. A sinusoidal modulation signal V(t) was applied to the electrodes of the MZ-structures. The modulation signal generated by the photodiode was visualized on an oscilloscope. The modulation has been measured in integrated MZ-structures with waveguide dimensions of the silicon core w×h=3 μm×200 nm and an electrode gap G=7 μm. Table 8 contains the calculated half-wave voltages, considering a field overlap Γ≈1. The results are given for the experimental device configuration with w×h=3 μm×200 nm and G=7 μm and our proposed ideal configuration with w=400 nm, h=150/180 nm, and G=600 nm. MZ-modulators based on wire waveguides with OH1 as electro-optic cladding can lead to half-wave voltages $V_{\pi,ideal} \cdot L$ below 1 Vcm. This is much lower than what is possible with state of the art $LiNbO_3$ modulators.

TABLE 8

Calculated values for the half-wave voltage $V_\pi \cdot L$ of SOI based MZ-modulators at wavelengths around 1550 nm with the electro-optically active cladding material OH1.

| Mode | $\xi_{n_i;\ exp}$ [%] | $V_{\pi,\ exp} \cdot L$ [Vcm] | ideal w × h [nm × nm] | $\xi_{n_i;\ ideal}$ [%] | $V_{\pi,\ ideal} \cdot L$ [Vcm] |
|---|---|---|---|---|---|
| TM | 60 | 31 ± 1 | 400 × 180 | 80 | 2.0 |
| TE | 13 | 9 ± 1 | 400 × 150 | 60 | 0.17 |

The cladding modulation efficiency $\xi_{n_i}$ is given by $\partial n_{eff}/\partial n_i|_{n_i/3}$. Exp: Experimental device. Ideal: Proposed MZ-structure with single-mode SOI wire waveguides.

9.5 Conclusion

We have fabricated electro-optic amplitude modulators based on integrated Mach-Zehnder interferometer structures with single crystalline OH1 as cladding material. Silicon-on-insulator wafers were used with a 200 nm thick SOI layer. The waveguide structures were patterned with conventional optical lithography, producing waveguides with widths of 3 μm and up. For this first demonstration, multimode waveguides were used with the advantage of a simpler fabrication using optical lithography. The interferometer arms were 0.5 mm long and electrodes were deposited on both sides of the waveguide with a total gap of 7 μm. In order to achieve electro-optic activity with a possibility of ultra-fast modulation, OH1 was chosen as cladding material, since it offers the possibility of growing single crystalline thin films on top of the integrated photonic structures. Mode-solver simulations have shown that the TM- and TE-modes guided by the silicon wires exhibit a high efficiency for cladding modulation. In other words, a refractive index change in the cladding material results in a high change in effective index of the guided fundamental mode with an efficiency of up to 80% in the ideal configuration. This is due to the fact that considerable modal intensity is guided outside the waveguide core. Electro-optic modulation has been demonstrated in various operation points on the switching curve. The half-wave voltage could be estimated to be $V_{\pi,exp} \cdot L = 45 \pm 10$ Vcm, measured for TM-modes, in agreement with the theoretical calculation, with estimated modulation frequencies of up to about 200 GHz. This result proves the compatibility of the electro-optically active organic material OH1 with the highly advanced passive SOI technology. This work demonstrates an interesting way how to exploit the advantages of the passive SOI technology in combination with the ultra-fast electro-optic activity in organic crystalline materials, with highly stable chromophore orientation. An optimized waveguide-electrode structure, which can be obtained using e.g. e-beam lithography, has the potential to decrease the half-wave voltage×length product to 2 Vcm and even to 0.2 Vcm for TM- and TE-modes, respectively. The modulation bandwidth can be extended beyond the limits of todays commercially available modulators based on $LiNbO_3$, due to the ultra-fast electro-optic response, previously demonstrated in OH1 as a THz-wave emitter. The proposed configuration for cladding modulation can be readily applied to other crystalline materials and circumvents technological issues present in the context of slotted waveguide structures as well as conventionally fabricated active waveguides.

10. Bulk OH1 Single Crystals Grown from Solution by Either Slow Evaporation or Slow Cooling Methods 10.1. Phase Diagram The growth of crystals from solution was optimized according to the phase diagram of the solute/solvent system.

The solubility of OH1 was measured in different solvents and at two different temperatures; the results are shown in Table 9. OH1 molecules are dissolved very well in acetone and acetonitrile, and relatively good in ethanol and methanol. We selected methanol as the solvent for growing the crystals because the solubility in acetone is too high and the solute yield on decreasing the temperature is the most efficient in methanol.

The solubility of OH1 in methanol as a function of temperature is shown in FIG. 25; the solid curve is according to the Van't Hoff equation with the solution enthalpy ΔH=29±2 kJ/mol and entropy change ΔS=47±5 kJ/mol.

The metastable-zone width is a very important parameter for both inducing the nucleation and growth of high optical quality and large size single crystals. The metastable zone width for OH1 in methanol is very large, around 40° C., as shown in FIG. 25. (For example, for the benchmark DAST crystals in methanol the metastable zone is only about 7° C. wide in the same temperature range). The very large metastable-zone width is related to strong hydrogen-bonding interactions between the OH1 molecules and the methanol molecules.

TABLE 9

Solubility of OH1 in different solvents (g/100 g solvent).

| | Acetone | Acetonitrile | Ethanol | Methanol | Methylene chloride |
|---|---|---|---|---|---|
| 25° C. | 25.9 | 4.32 | 2.34 | 2.15 | 1.4 |
| 40° C. | 41.8 | 5.3 | 2.5 | 3.4 | 1.9 |

10.2 Growth of OH1 Seed Crystals by Spontaneous Nucleation

The nucleation in an impurity-free solution at a certain temperature will easily appear only when the solution concentration exceeds the upper boundary of the metastable zone. Conventionally the nucleation is achieved in the following way: starting from the saturated solution, the solvent is left to evaporate at a constant temperature or the temperature of the solution is decreased; nucleation will appear after the solution concentration exceeds the metastable zone boundary.

For OH1/methanol this method is, due to the very wide metastable area, of a very limited use, since almost all the solvent should evaporate to achieve nucleation or the temperature should be decreased by more than 40° C. Consequently, after nucleation the supersaturation will be extremely high. (We define the supersaturation σ as $\sigma=(C-C_{eq})/C_{eq}$; C is the actual concentration and $C_{eq}$ the equilibrium concentration). For such high supersaturation, the seed will grow too fast and therefore most often with a low optical quality. To induce nucleation of OH1 in methanol, we can: Introduce foreign particles (impurities) to seed the nucleation, or: Induce nucleation locally by an externally induced fluctuation.

Use a growth container having hydrophilic surfaces, the nucleation will be induced at the air/solution/container interfaces and also solution/container interfaces.

10.2.1 Control of the Morphology (Thickness) of the Spontaneously Nucleated Crystals Grown at Constant Temperature by Slow Evaporation The spontaneously nucleated crystals of OH1 can be grown with a different morphology depending on the nucleation conditions. Thin crystals will be obtained if the supersaturation is low (lower than 0.05), while thicker crystals will appear at higher supersaturations. The thickness will also depend on the number of nuclei (which will affect the supersaturation ratio), which can be controlled by the interface or impurity conditions, as well as the evaporation rate.

10.3 Growth of Large-size Bulk Crystals by the Slow Cooling Method from a Seed Crystal Slow evaporation method can yield in case of OH1/methanol large-area (1 cm$^2$ and more) crystals with a high optical quality, but the thickness limited to a few mm.

Thicker crystals (up to 1 cm and more) of a high optical quality can be grown by a slow cooling method from a seeded solution. For this:

Best seed crystals grown by spontaneous nucleation are chosen. Several crystallographic faces can be observed on these crystals, as shown in FIG. 26.

A seed crystal is attached to a holder, so that their −c side (see FIG. 26) is at the holder. The seed will grow mostly along the (0,1,1) and (0,−1,1) faces and in thickness (along the ± a direction).

The morphology (thickness to side length ratio) can be controlled by choosing an appropriate cooling rate. Because of the high metastable zone width, there is a lot of freedom in choosing different supersaturation ratios during the growth; the concentration should only remain within the wide metastable zone ranges of the seeded solution to keep the high optical quality of the grown crystals. In general, a higher supersaturation ratio (achieved by a faster cooling rate) will give thicker OH1 crystals.

High cooling rates of more than 5° C./day still give high optical quality single crystals.

The morphology of these crystals can be also modified by using other solvents or solvent combinations, e.g. methanol/ethanol mixtures. This will modify the phase diagram and therefore the growth characteristics.

OH1 crystals having side lengths of more than 1 cm and high optical quality can be grown very fast, in less than 1 week, by either slow evaporation or slow cooling methods. (For example, for the benchmark DAST crystal this time is 4-6 weeks).

Bulk and thin-film phenolic CLP crystals can be used for second-order nonlinear optical applications, such as frequency conversion, including terahertz wave generation (see FIG. 32), and electro-optic applications, including high-speed switching and modulation and integrated photonic structures, such as those illustrated in FIG. 33.

FIG. 32 shows: a) Schematic of terahertz-wave generation by difference-frequency generation, where two optical waves having closely spaced wavelengths $\lambda_1$ and $\lambda_2$ interact in a phenolic CLP crystal to generate a single-frequency terahertz wave, whose frequency can be tuned by tuning the wavelength of one or both of the pumping beams. b) Schematic of terahertz-wave generation by optical rectification, where various frequency components of a short pump optical pulse interact in a phenolic CLP crystal to create a broadband terahertz signal.

FIG. 33: a) The basic design of a microring resonator consists of a circular waveguide coupled to a straight port waveguide. b) Schematic view of a microring resonator with two port waveguides. c) Schematic drawing of a Mach-Zehnder interferometer. d) Combination of a microring resonator and a Mach-Zehnder interferometer. e) Schematic representation of a microring-resonator array in an optical network acting as active wavelength division multiplexer. f) Schematic of a photonic crystal waveguide modulator. Phenolic CLP crystal is used either as core waveguiding material or as active cladding material of higher-index waveguides (like silicon wires) or embedded inside slotted higher-index waveguides.

References

[1] Bosshard, C.; Busch, M.; Liakatas, I.; Jäger, M.; Günter, P. in *Nonlinear Optical Effects and Materials*, edited by P. Günter, Springer Series in Optical Science, Vol. 72, p. 163-300, Berlin Heidelberg New York 2000.

[2] Ma, H.; Jen, A. K. Y.; Dalton, L. R. *Adv. Mater.* 2002, 14, 1339-1365.

[3] Facchetti, A.; Annoni, E.; Beverina, L.; Morone, M.; Zhu, P. W.; Marks, T. J.; Pagani, G. A. *Nature Materials* 2004, 3, 910-917.

[4] Enami, Y.; Derose, C. T.; Mathine, D.; Loychik, C.; Greenlee, C.; Norwood, R. A.; Kim, T. D.; Luo, J.; Tian, Y.; Jen, A. K. Y.; Peyghambarian, N. *Nature Photonics* 2007, 1, 180-185.

[5] Tonouchi, M. *Nature Photonics* 2007, 1, 97-105.

[6] Reimann, K. *Rep. Prog. Phys.* 2007, 70, 1597-1632.

[7] Yang, Z.; Mutter, L.; Stillhart, M.; Ruiz, B.; Aravazhi, S.; Jazbinsek, M.; Schneider, A.; Gramlich, V.; Gunter, P. *Adv. Funct. Mater.* 2007, 17, 2018-2023.
[8] Rezzonico, D.; Kwon, S.; Figi, H.; Kwon, O.; Jazbinsek, M.; Gunter, P. *J. Chem. Phys.* 2008, 128, 124713.
[9] Marder, S. R.; Kippelen, B.; Jen, A. K. Y.; Peyghambarian, N. *Nature* 1997, 388, 845-851.
[10] Leclercq, A.; Zojer, E.; Jang, S. H.; Barlow, S.; Geskin, V.; Jen, A. K. Y.; Marder, S. R.; Bredas, J. L. *Journal Of Chemical Physics* 2006, 124, 044510.
[11] Marder, S. R.; Perry, J. W.; Schaefer, W. P. *Science* 1989, 245, 626-628.
[12] Pan, F.; Knopfle, G.; Bosshard, C.; Follonier, S.; Spreiter, R.; Wong, M. S.; Gunter, P. *Appl. Phys. Lett.* 1996, 69, 13-15.
[13] Kwon, O. P.; Ruiz, B.; Choubey, A.; Mutter, L.; Schneider, A.; Jazbinsek, M.; Gramlich, V.; Gunter, P. *Chem. Mater.* 2006, 18, 4049-4054.
[14] Kwon, O. P.; Kwon, S. J.; Jazbinsek, M.; Choubey, A.; Gramlich, V.; Gunter, P. *Adv. Funct. Mater.* 2007, 17, 1750-1756.
[15] Kwon, O. P.; Kwon, S. J.; Figi, H.; Jazbinsek, M.; Gunter, P. *Advanced Materials* 2008, 20, 543-+.
[16] Kolev, T.; Glavcheva, Z.; Yancheva, D.; Schurmann, M.; Kleb, D.-C.; Preut, H.; Bleckmann, P. *Acta Crystallographica Section E* 2001, 57, o561-o562.
[17] Kwon, O. P.; Kwon, S. J.; Stillhart, M.; Jazbinsek, M.; Schneider, A.; Gramlich, V.; Gunter, P. *Crystal Growth & Design* 2007, 7, 2517-2521.
[18] Marder, S. R.; Perry, J. W.; Yakymyshyn, C. P. *Chem. Mater.* 1994, 6, 1137-1147.
[19] Pan, F.; Wong, M. S.; Bosshard, C.; Gunter, P. *Adv. Mater.* 1996, 8, 592-&.
[20] Schneider, A.; Neis, M.; Stillhart, M.; Ruiz, B.; Khan, R. U. A.; Gunter, P. *J. Opt. Soc. Am. B* 2006, 23, 1822-1835.
[21] Schneider, A.; Biaggio, I.; Gunter, P. *Appl. Phys. Lett.* 2004, 84, 2229-2231.
[22] Schneider, A.; Stillhart, M.; Gunter, P. *Opt. Express* 2006, 14, 5376-5384.
[23] Manetta, S.; Ehrensperger, M.; Bosshard, C.; Gunter, P. *C. R. Phys.* 2002, 3, 449-462.
[24] Thakur, M.; Xu, J. J.; Bhowmik, A.; Zhou, L. G. *Appl. Phys. Lett.* 1999, 74, 635-637.
[25] Shumate, M. S. *Applied Optics* 1966, 5, 327-331.
[26] Bosshard, C.; Sutter, K.; Pretre, P.; Hulliger, J.; Florsheimer, M.; Kaatz, P.; p. Gunter, *Gordon and Breach Science Publishers*, Amsterdam 1995.
[27] Jerphagnon, J.; Kurtz, S. K. *Journal of Applied Physics* 1970, 41, 1667-1681.
[28] Meier, U.; Bosch, M.; Bosshard, C.; Pan, F.; Gunter, P. *J. Appl. Phys.* 1998, 83, 3486.
[29] Anhoj, T. A.; Jorgensen, A. M.; Zauner, D. A.; Hubner, J. *Journal of Micromechanics and Microengineering* 2006, 16, 1819-1824.
[30] Joshi, G.; Pawde, S. M. *Journal of Applied Polymer Science* 2006, 102, 1014-1016.
[31] Schmidt, M. A. *Proc. IEEE* 1998, 86, 1575-1585.
[32] Tong, Q.-Y.; Gosele, U. *Semiconductor wafer bonding: science and technology*; John Wiley & Sons: New York, 1999.
[33] Lindner, P.; Dragoi, V.; Farrens, S.; Glinsner, T.; Hangweier, P. *Solide State Technol.* 2004, 47, 55-58.
[34] Berthold, A.; Nicola, L.; Sarro, P. M.; Vellekoop, M. J. *Sensors and Actuators A* 2000, 82, 224-228.
[35] Almeida, V. R.; Xu, Q.; Barrios, C. A.; Lipson, M. *Opt. Lett.* 2004, 29, 1209-1211.
[36] Hochberg, M.; Baehr-Jones, T.; Wang, G.; Huang, J.; Sullivan, P.; Dalton, L.; Scherer, A. *Opt. Express* 2007, 15, 8401-8410.
[37] P. Dumon, W. Bogaerts, V. Wiaux, J. Wouters, S. Beckx, J. Van Campenhout, D. Taillaert, B. Luyssaert, P. Bienstman, D. Van Thourhout, and R. Baets. *Low-loss SOI photonic wires and ring resonators fabricated with deep UV lithography*. IEEE Phot. Tech. Lett. 16(5), 1328-1330 (2004)
[38] P. Dumon, G. Priem, L. R. Nunes, W. Bogaerts, D. Van Thourhout, P. Bienstman, T. K. Liang, M. Tsuchiya, P. Jaenen, S. Beckx, J. Wouters, and R. Baets. *Linear and nonlinear nanophotonic devices based on silicon-on-insulator wire waveguides*. Jpn. J. Appl. Phys. 45(8B), 6589-6602 (2006)
[39] G. T. Reed and A. P. Knights. *Silicon Photonics*. John Wiley & Sons Ltd. (2004)
[40] G. Priem, P. Dumon, W. Bogaerts, D. Van Thourhout, G. Morthier, and R. Baets. *Optical bistability and pulsating behaviour in silicon-on-insulator ring resonator structures*. Opt. Express 13(23), 9623-9628 (2005)
[41] C. K. Tang and G. T. Reed. *Highly efficient optical-phase modulator in SOI wave-guides*. Electron. Lett. 31(6), 451-452 (1995)
[42] M. Hochberg, T. Baehr-Jones, G. Wang, J. Huang, P. Sullivan, L. Dalton, and A. Scherer. *Towards a millivolt optical modulator with nano-slot waveguides*. Opt. Express 15(13), 8401-8410 (2007)
[43] V. R. Almeida, Q. F. Xu, C. A. Barrios, and M. Lipson. *Guiding and confining light in void nanostructure*. Opt. Let. 29(11), 1209-1211 (2004)

What is claimed is:

1. A method for growing a bulk single crystal of a configurationally locked polyene compound with a phenolic electron donor, the compound being represented by the formula (I):

Formula (I)

wherein n=1, 2, 3 or 4,
wherein R1 and R2, being identical or different, are independently chosen from the group consisting of: H (Hydrogen), D (Deutrium), and any perhalogenated, halogenated or non-halogenated aliphatic or aromatic group,
wherein at least one carbon atom of the aliphatic or aromatic group is optionally functionalized with at least one of: hydroxy, ether, ester, amino, silyl, and siloxy group, and
wherein the method comprises the following steps:
predefining at least one of a minimal crystal thickness and a thickness to side length ratio of the crystal;
providing the compound solved in a solvent or as a melt;
slowly evaporating the solvent or slowly cooling the solution or the melt; and
growing the bulk single crystal, said step of growing comprising the sub-steps of:
controlling the thickness of the single crystal by controlling at least one of the following growth parameters:

supersaturation, cooling rate, evaporation rate, temperature, pressure, amount of the solution, and temperature gradients; and choosing at least one of said growth parameters so that the bulk single crystal grows to the at least one predefined minimal crystal thickness or thickness to side length ratio of the crystal.

2. The method according to claim 1, wherein the compound is defined by $R1=R2=CH_3$ or $R1=CH_3$ and $R2=H$ or $R1=R2=H$.

3. The method according to claim 1, wherein a melt-based growth method is used.

4. A method for manufacturing a photonic device comprising the steps of:
   providing a prepared substrate;
   growing a bulk single crystal on the prepared substrate by the method according to claim 1; and
   cleaving the substrate with the bulk single crystal grown thereon to produce a clean facet required for coupling light into the photonic device.

5. The method according to claim 4, wherein the photonic device is a:
   waveguide;
   directional coupler;
   microring resonator;
   photonic bandgap structure;
   optical switch;
   optical filter;
   optical modulator;
   sensing element, field detector; or frequency converter for the generation and detection of infrared, far infrared, or THz radiation.

6. The method according to claim 3, wherein the melt-based growth method used is a Czochralski technique, a Bridgman-Stockbarger technique or a zone-melting technique.

* * * * *